(12) United States Patent
Freeman et al.

(10) Patent No.: US 12,184,623 B2
(45) Date of Patent: *Dec. 31, 2024

(54) SYSTEMS AND METHODS FOR DATA COMMUNICATIONS

(71) Applicant: STEP Software Inc., London (CA)

(72) Inventors: James Leo Freeman, London (CA); Robert Jan Nijkamp, London (CA)

(73) Assignee: STEP SOFTWARE INC., London (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/199,152

(22) Filed: May 18, 2023

(65) Prior Publication Data
US 2023/0370436 A1 Nov. 16, 2023

Related U.S. Application Data

(63) Continuation of application No. 17/790,403, filed as application No. PCT/CA2021/050722 on May 27, 2021, now Pat. No. 11,777,912.

(60) Provisional application No. 63/030,576, filed on May 27, 2020.

(51) Int. Cl.
| | |
|---|---|
| *G06F 21/62* | (2013.01) |
| *G06F 21/31* | (2013.01) |
| *H04L 9/32* | (2006.01) |
| *H04L 9/40* | (2022.01) |
| *G06F 21/41* | (2013.01) |
| *G06F 21/45* | (2013.01) |

(52) U.S. Cl.
CPC ........ *H04L 63/0428* (2013.01); *H04L 9/3239* (2013.01); *H04L 63/0876* (2013.01); *H04L 63/101* (2013.01)

(58) Field of Classification Search
None
See application file for complete search history.

(56) References Cited

U.S. PATENT DOCUMENTS

| | | | | |
|---|---|---|---|---|
| 7,873,996 | B1 * | 1/2011 | Emigh | H04L 51/212 |
| | | | | 726/22 |
| 8,001,189 | B2 * | 8/2011 | Nielsen | H04L 63/126 |
| | | | | 709/206 |
| 11,362,982 | B2 * | 6/2022 | Chasse | H04L 51/212 |
| 11,777,912 | B2 * | 10/2023 | Freeman | H04L 63/0428 |
| | | | | 713/160 |

(Continued)

OTHER PUBLICATIONS

United States Patent & Trademark Office (USPTO), Non Final Rejection to U.S. Appl. No. 17/790,403, filed Jan. 23, 2023.

(Continued)

*Primary Examiner* — Venkat Perungavoor
(74) *Attorney, Agent, or Firm* — Norton Rose Fulbright Canada LLP

(57) ABSTRACT

A middleware system and corresponding methods are described whereby data communications, either inter-device or intra-device, are coordinated using a set of cryptographic identifiers that correspond to computing elements, such as interfaces, methods, parameters, classes, among others, the identifiers used for authentication against an access control list to determine whether an originator device is permitted to use a computational element. The cryptographic identifiers are coupled to data messages being sent across the middleware system.

20 Claims, 31 Drawing Sheets

(56) References Cited

U.S. PATENT DOCUMENTS

| | | | | |
|---|---|---|---|---|
| 2004/0073617 | A1* | 4/2004 | Milliken | G06F 21/562 |
| | | | | 709/224 |
| 2005/0220095 | A1 | 10/2005 | Narayanan et al. | |
| 2006/0031346 | A1* | 2/2006 | Zheng | H04L 51/212 |
| | | | | 709/229 |
| 2006/0136420 | A1* | 6/2006 | Gandhi | G06F 16/9574 |
| | | | | 707/999.009 |
| 2006/0200531 | A1* | 9/2006 | Tokuda | H04L 51/224 |
| | | | | 709/206 |
| 2007/0005801 | A1 | 1/2007 | Kumar et al. | |
| 2007/0050461 | A1* | 3/2007 | Petry | G06Q 20/1085 |
| | | | | 709/206 |
| 2012/0110334 | A1 | 5/2012 | Rossi | |
| 2015/0200857 | A1* | 7/2015 | Tang | H04L 47/125 |
| | | | | 370/236 |
| 2016/0050139 | A1* | 2/2016 | Wrenn | H04L 67/14 |
| | | | | 370/232 |
| 2016/0147782 | A1* | 5/2016 | Roseman | G06F 16/16 |
| | | | | 707/822 |
| 2016/0269422 | A1* | 9/2016 | McDougal | H04L 51/066 |
| 2018/0013710 | A1* | 1/2018 | Khan | H04L 51/212 |
| 2018/0219830 | A1* | 8/2018 | O'Brien | H04L 61/5007 |
| 2019/0132273 | A1* | 5/2019 | Ryan | H04L 63/1483 |
| 2022/0321518 | A1* | 10/2022 | Khan | H04L 63/08 |

OTHER PUBLICATIONS

European Patent Office, Communication re. extended European search report for European patent application No. 21813563 dated May 29, 2024.

Canadian Intellectual Property Office, Examiner's Requisition dated Mar. 4, 2024 re: application No. 3,177,514.

* cited by examiner

```
iotp.io/interface/ILogger; # interface name
  - uint64 getRemainingNotificationCount(uint64 notifyID);
  - any getNotifications(uint64 notifyID, uint16 &notifyQuantity);
```

FIG. 4A

```
iotp.io/class/Log: # class name
  - iotp.io/interface/ILogger; # interface name
    - uint64 getRemainingNotificationCount(uint64 notifyID);
    - any getNotifications(uint64 notifyID, uint16 &notifyQuantity);
  - iotp.io/interface/ILogViewer; # interface name
    - any getLogs(DateTime from, DateTime to, any filter, uint16 &logQuantity);
```

FIG. 4B

```
iotp.io/app/Notification: # app name
  - iotp.io/class/Notifier: # class name
    - iotp.io/interface/INotify: # interface name
      - uint64 getRemainingNotificationCount(uint64 notifyID);
      - any getNotifications(uint64 notifyID, uint16 &notifyQuantity, uint64 *nextNotifyID);
```

FIG. 4C

```
- iotp.io/app/Log: # app name
  - iotp.io/class/Log: # class name
    - iotp.io/interface/ILogger: # interface name
      - uint64 getRemainingNotificationCount(uint64 notifyID);
      - any getNotifications(uint64 notifyID, uint16 &notifyQuantity);
    - iotp.io/interface/ILogViewer: # interface name
      - any getLogs(DateTime from, DateTime to, any filter, uint16 &logQuantity);
```

```
- iotp.io/enum/CardSuit:  # enum name
    - Spades    # enum-item name 'Spades' with a value of 0 (auto assigned)
    - Clubs     # enum-item name 'Clubs' with a value of 1 (auto assigned)
    - Hearts    # enum-item name 'Hearts' with a value of 2 (auto assigned)
    - Diamonds  # enum-item name 'Diamonds' with a value of 3 (auto assigned)
```

FIG. 4F

```
- iotp.io/enum/DayOfWeek:  # enum name
    - Monday:    0  # enum-item name 'Monday' with a value of 0
    - Tuesday:   1  # enum-item name 'Tuesday' with a value of 1
    - Wednesday: 2  # enum-item name 'Wednesday' with a value of 2
    - Thursday:  3  # enum-item name 'Thursday' with a value of 3
    - Friday:    4  # enum-item name 'Friday' with a value of 4
    - Saturday:  5  # enum-item name 'Saturday' with a value of 5
    - Sunday:    6  # enum-item name 'Sunday' with a value of 6
```

FIG. 4G

```
- iotp.io/struct/Notification:  # struct name
    - notifyID: uint64  # struct-item name and type
    - msg: string       # struct-item name and type
```

FIG. 4H

```
iotp.io/struct/Address: # struct name
  - street1: string # struct-item name and type
  - street2: string # struct-item name and type
  - city: string # struct-item name and type
  - state: string # struct-item name and type
  - zipcode: string # struct-item name and type
  - country: string # struct-item name and type
```

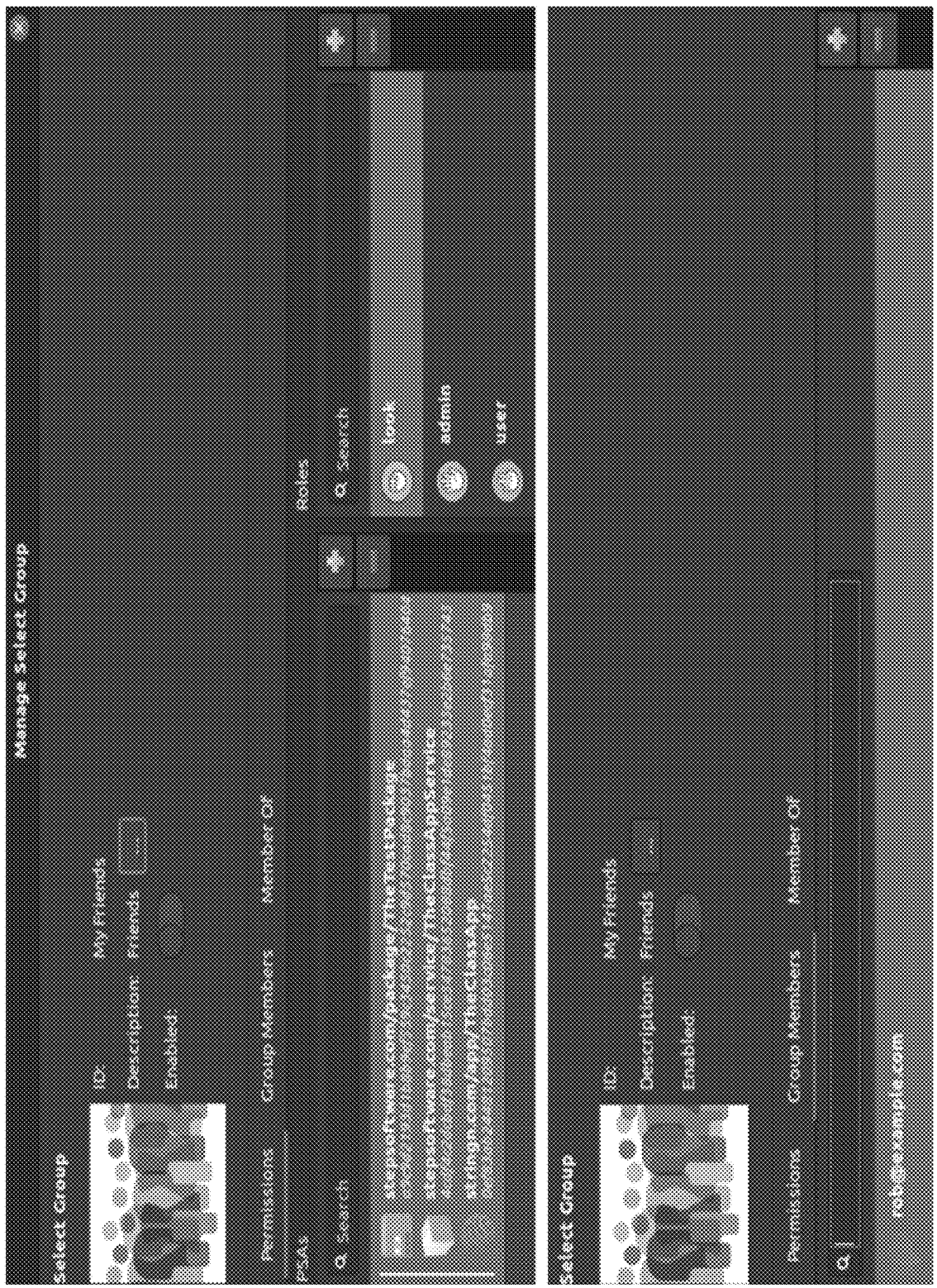

SYSTEMS AND METHODS FOR DATA COMMUNICATIONS

CROSS REFERENCE

This application is a Continuation of U.S. application Ser. No. 17/790,403 filed on Jun. 30, 2022, which is a 371 US National Stage Application of PCT Application No. PCT/CA2021/050722 filed on May 27, 2021, which is a non-provisional of, and claims all priority to, U.S. Application No. 63/030,576, filed 2020 May 27, entitled "Systems and Methods for Data Communications" incorporated herein by reference in its entirety.

FIELD

Embodiments of the present disclosure generally relate to the field of computer networking and data communications, and more specifically, embodiments relate to devices, systems and methods for efficiently routing and coordinating data communications using cryptographic signatures.

INTRODUCTION

Data communications has become increasingly complex, especially given the proliferation of different standards and protocols.

A system may be comprised of a loosely coupled, heterogeneous set of devices which need to have robust communications between one another. These communications may, for example, be conducted in accordance with syntactical/format requirements or message encapsulation (e.g., specific header information) requirements for communications.

There are existing middleware solutions that provide message bus type mechanisms that can, for example, queue and buffer messages for asynchronous delivery.

However, these solutions have technical shortcomings, which can include requiring a centralized system to call a service on a particular machine (e.g., providing a central point of failure), only providing security as an add-on via an HTTPS connection, with a centralized credentials provider, and poor access control (e.g., when access control lists were added into the approaches, there was no facility to limit access of the user to the service, application, class, interface, or method, and this needed to be built separately from the system). These shortcomings lead to untrusted communications and difficulties relating to device communications between different "stacks" of protocols that lead to islands or silos of interoperability. Even minor differences in schema adherence, such as syntactical differences, different types of variables used as parameters, etc., can lead to dropped messages, unhandled exceptions, among others.

From a message targeting perspective, there often is little to no concept of a target user in a service call. For XMPP services, the target user was not an actual user, but was instead a means to invoke the remote service, and in most cases, there is no ability to communicate to a service behind a firewall (P2P). Existing approaches are further vulnerable to man in the middle (MITM) type attacks, whereby a malicious user with access to the service machine can write software to use the calls if that malicious user can access the web server environment. This can be especially problematic where executable code is not signed (e.g., verified) prior to execution.

Example approaches for machine to machine interfaces include XML-RPC, SOAP and REST, and all of these approaches struggle with incompatibility issues, and accordingly, machine to machine communications have often been a patchwork approach designed for a human centric Internet standard, or in a closed system where one (or a few) island(s) of computing share a system of credentials, access control, and simple definitions of intercommunication, where the most common way to address the island issue is to pick a central provider to manage intercommunication between devices, such as Works with Google Assistant (WWGA) or Amazon's Alexa Voice Service (AVS). This requires the publisher of a service to pick one (or more) winners from the limited list of providers, or build an island of their own. Even when picking a commercial central provider, a designer may find themselves enlisting a competitor in order to have some chance at interconnecting with other services. However, the approach still has drawbacks as the standards could be thin, the features are limited, and at any time a new license or owner may make their central provider unpalatable or unavailable to continue working with.

Regardless of whether a developer chose XML-RPC, SOAP, REST, CORBA, DCOM, XMPP Jabber Components, WWN, WWGA, AVS, or another technology, they were left with shortcomings.

SUMMARY

Existing protocols typically have weak service definitions of one or more callable methods, with no concept of an application definition, nor a collection of applications to be bundled by a service provider, and do not provide an ability to identify or confirm the author of published interfaces, classes, applications, services, nor the identity of the service publisher (i.e., described herein as the package), and it is this weak service definition that makes it difficult to have strong interface discovery across devices.

An improved computational approach is described in various embodiments. The approach includes corresponding systems, methods, computer readable media (e.g., computer-based articles of manufacture). The approach can be implemented as a computing system that provides an improved computing intermediary layer (e.g., "middleware"). The computing layer is a set of message handler components which can be used for coordinating messaging between devices and/or logical objects (e.g., inter device or intra device communications). The computing layer is effectively a set of intermediary devices, such as routers, switches, switching circuits which provide messaging services to the connected devices.

The messaging services can include inter device communications, intra device communications, among others, and the messaging services can include queuing/storing of messages in message buffers for asynchronous communications, handshaking protocols, message transmission confirmation/acknowledgement receipt, error correction code implementation, among others. The messaging services can operate, for example, a message-oriented middleware.

The messaging services are particularly important where there is a high degree of complexity in the types of interfaces that are used to either encapsulate or process messages. For example, the devices may be a heterogeneous mixture of different devices that were built for different stacks, or built for different generations of systems (e.g., legacy COBOL-based systems) that need to interact with one another.

This issue is particularly prevalent in enterprise-level organizations as complex backend computing infrastructure is built piecemeal over a number of computing technology generations as the organization scales. In another example computing context, the middleware aspects described herein can also be used in relation to smart home/internet of things applications where there are a potentially large number of heterogeneous devices that need improved communication services (e.g., where basic point to point communications are no longer sufficient).

The computational approach described herein is directed to an improved protocol for data message encapsulation and routing as between devices and logical objects (e.g., caller/callees). The computing system can be one or more servers, which can operate in conjunction with one another to provide an improved message coordination/routing platform that operates to enable various components of a distributed system to communicate and manage data. The computing system is adapted to enable interoperability and improved communication flows to simplify and improve the security/robustness of inter device communications.

An illustrative, non-limiting example may be provided in the context of a mail server. There may be different types of interface protocols for different technology stacks, such as the Microsoft Exchange™, IBM Lotus™, and Google Mail™, and Yahoo Mail™. While each of these technologies may ostensibly operate using the Simple Mail Transfer Protocol (SMTP), for the purposes of this example, each of these technology stacks use a different non-standard, potentially proprietary mail protocol with custom methods in addition to SMTP, effectively providing non-standard variations to their mail APIs.

In this example, each organization has invested significant time and effort into improving on the underlying interface definition, but as a result, the interface operability has deviated from a common standard and there may be different data message/processing schemas being used and messages from one device may have processing difficulties when sent to another device. Non-standard variations are commonly encountered as organizations tailor their technology to suit their particular contexts. Communication protocols and schemas are modified in non-standardized ways, such as repurposing fields, changing variable types, adding or removing parameters as arguments, requiring enhanced encryption, among others. Non-standardization permits for more flexible uses of the technology stacks. However, non-standardization also causes significant costs for establishing technical interoperability (e.g., adding a new device or new technology partner requires significant system integration efforts).

The system is configured to alleviate the above technical challenges by implementing a computer implemented method for coordinating data messaging. The system can include computing components, such as a message handler daemon configured to receive and process incoming messages, an incoming message buffer, a message transformation engine, an access controller, a message encapsulation engine, and an output message buffer, according to some embodiments. These computing components can be implemented using one or more physical computer processors, and the computing instructions (e.g., software modules) provided in the form of machine interpretable instruction sets that can be executed to perform steps of various methods described herein. The coordinated data messaging, for example, can be utilized as the technical architecture underlying implementation, for example, through the robust establishment of roles and access control lists using hierarchical cryptographic fingerprints described herein.

There are different possible variations for implementation. For example, the system can be provided for use inter-device (e.g., as an intermediary middleware server or server devices), intra-device (e.g., as a process running on a machine for communications between users sand-boxed into various user-spaces), or a combination thereof (e.g., each device has a middleware process instance running, and communications between the devices to specific user-spaces thereof are coordinated by the corresponding middleware processes either communicating with each other or communicating with the target user-spaces). Users, devices, user-spaces, etc., may be automatically coupled to access control mechanisms which control interface-level access at an account level, and the middleware system described herein may utilize associated cryptographic fingerprints to verify and validate roles and access permissions in a computationally efficient way.

The system may include one or more certificate authorities that are utilized for authenticating messages and/or interface usage/adoption, and these certificate authorities can be used during device/interface onboarding or discovery to establish cryptographic authentication mechanisms for later usage. Other components of the system can include load balancers, network interface controllers, web interface controllers, cryptographic engines, among others. The utilization of certificate authorities can be used to attach metadata or require the use of public/private keys before a particular transformation may be utilized, or a specific cryptographic fingerprint can be validated for use. Certificates can be used, for example, to establish the identity of an originator device or a caller associated device, which can then be utilized against an access control list to establish that this device is indeed authenticated to utilize a particular fingerprint. In another example, the certificates are utilized instead to provide a cryptographically signed approach for indicating that a particular use of a transformation is requested, so that the use can be tracked and credits can be paid out. In this example, hospital 1 may have invested into developing a highly secure conversion tool for transforming incoming patient data originally provided in HL7 schema that sanitizes the incoming patient data, corrects for mistakes, and transforms the data for ingestion by a "major device manufacturer" proprietary heart rate monitoring/alarm device. If hospital 2 wishes to utilize this tool, they may utilize their public key to sign a message that is incorporated into header information of message packets they sent to the system described herein, which then records a debit against hospital 2 and a credit to hospital 1. The debits and credits can be utilized to provide a benefit to hospital 1, which, in some cases, can be tracked for remuneration of the costs of developing the tool, or in other cases, can be associated with preferential access to the system described herein (e.g., buffer queue priority enhancements). Preferential access, for example, can be controlled by buffer queue priority established through logical rules, such as improved positioning in a queue, establishment of a separate priority queue for interleaving messages relative to the regular queue for communication, among others. Other types of debits and credits can include a reduction in the overall cost of using the system (e.g., developer contributions to the ecosystem are valued).

In a first embodiment, the approach includes providing a set of cryptographic identifiers representing one or more interaction characteristics of a computational element associated with a hardware device or a software handler. These cryptographic identifiers, for example, can be referred to as "fingerprints", and as noted below, can be used to indicate whether a message is processed, modify how the message is processed, and in some embodiments, modify the message itself. These cryptographic identifiers are utilized to provide a readily verifiable but difficult to reverse secure mechanism for authenticating the metadata or header data indicative of adherence (or desired adoption of) a particular computational element schema.

The new message is received for routing to a target device or a logical target associated with the target device for processing, and the new message including at least one cryptographic identifier of the set of cryptographic identifiers. For example, the new message may be appended with a fingerprint of a desired interface that is indicated to be adopted (e.g., a target interface type) or it can be appended with the fingerprint of the interface the message is already designed to be processed using. The fingerprint may be stored, for example, as header information on a data packet storing the data message as a payload, or provided directly into the payload itself.

In the simplified MailServer example, the message can be received that indicates that this is a NewMailMessage (target IP address, payload) having fingerprints F1, F2, and F3. Fingerprints F1, F2, and F3 in this case show that New-MailMessage is configured in adherence with interfaces from software stack1, in particular MailMessage-ClassStack1 (F1) and in adherence with MailMessage-ClassStack1. Interface1 (F2) and MailMessageClassStack1.Interface1.CreateNewEmail method (F3). The fingerprints can be various types of message hash digests.

The new message is processed by the message handler daemon along with the fingerprints after it is provided onto a message bus (e.g., provided into an input message buffer). The message handler daemon identifies, for example, by comparing the fingerprints F1, F2, and F3 against a reference data structure, a corresponding computational element corresponding to the at least one cryptographic identifier of the new message for routing to the target device.

The computational element, as identified, can include various types of schema to be adhered to, such as enumerated types, structures, parameter/variable types (e.g., floats vs. shorts, shortint vs. longint, arrays, Booleans, linked lists, defined variables), methods for adherence (e.g., a C/C++ method), or groups of methods. The computational element may also identify, at a higher level, schema adherence more broadly to classes (collections of one or more interfaces), applications (collections of one or more classes), services (collections of one or more applications), packages (collections of one or more services).

The message can be processed by the daemon to either send the message as-is in the event that the message can be validated and the ability of the destination/target to handle the corresponding computational element is validated, or the message can be transformed so that it can be handled properly by the of the destination/target. The routing of the processed new message to the target device can include, for example, loading the processed new message on to a buffer associated with a message bus for asynchronous routing of the processed new message to the target device. The buffer can be utilized as a "store and forward" type service where the message is sent when the target device is available. For a system where there are a large volume of messages, the buffers can also be utilized to establish communication priority across congested network channels. Priority can be modified in certain situations described herein, for example, based on device/caller/callee identification, based on routing logic, among others.

Cryptographic identifiers, as noted above, can be considered "fingerprints", and are an improved mechanism for providing data communications middleware. For example, the fingerprints can be established in conjunction with a discovery mechanism, such that the fingerprints are registered onto a data structure of an access controller that can be referenced for identifying corresponding interfaces.

The "fingerprints" representing the set of cryptographic identifiers can be, for example, generated using cascaded hashing across a plurality of interface interaction layers such that the cascaded hashing provides a hierarchy of hashing interrelationships that can be utilized for validation that a lower cryptographic identifier belongs within a higher cryptographic identifier relative to positioning within the plurality of interface interaction layers. The interrelationships established using cascaded hashing can be useful, for example, in reduced computations being required to be able to validate that a fingerprint belongs to the group of fingerprints directly above it (e.g., leaf/parent node validation in a Merkle tree). Not all embodiments require cascaded hashing.

An example set of plurality of interface interaction layers can include, for example, at least two of: parameters, programmatic methods that include as arguments the parameters, programmatic interfaces that are comprised of the one or more programmatic methods, programmatic classes that are comprised of the one or more programmatic interfaces, programmatic applications that are comprised of the one or more programmatic classes, and programing services that are comprised of the one or more programmatic applications; and wherein the cascaded hashing incorporates the hashing relationships indicative of the relationships between related elements of the plurality of interface interaction layers. In some embodiments, the interface interaction layers are a single layer.

Accordingly, in a variant embodiment, the fingerprints can be used not only for identifying the particular interaction type the message is adapted for, the cascaded relationship can be used to identify hierarchical relationships thereof between fingerprints, and multiple fingerprints can be utilized in the context of a particular message indicating broadly or narrowly the types of parameters being passed, classes to be utilized, methods, interface types, etc. In another variation, the fingerprints can also be associated with establishing priority access levels.

The fingerprints can also be used for controlling discovery, authentication, and/or permissions to utilize specific computational elements, such as interfaces. For example, the fingerprints can be referenced with an access control data structure that stores data values indicating the originator/author of the computational element, the types of devices that are approved or disapproved utilize this computational element, and any expected remuneration that needs to be provided to the originator/author whenever the computational element is adopted or used.

For example, the processing of the new message can include (i) authenticating the new message by comparing the at least one cryptographic identifier of the new message using an access control list (ACL) against an identifier of an originator device of the new message to determine whether the originator device is permitted to use the computational element associated with the at least one cryptographic identifier; and (ii) transforming the new message to indicate authorization of the utilization of the computational element associated with the at least one cryptographic identifier, or (i) authenticating the new message by comparing the at least one cryptographic identifier of the new message using a list of known computational elements capable of being processed by the target device to identify the target computational element, and (ii) transforming the new message to indicate authorization of the utilization of the computational element associated with the at least one cryptographic identifier.

Where approved, for example, the new message may then be transformed to correspond with a new schema associated with the computational element associated with the at least one cryptographic identifier. In some embodiments, the fingerprints can be associated with a certificate authority such that the fingerprints can be associated with various public/private keys stored thereon, that, for example, are associated with various organizations. These can be utilized, for example, to establish that a fingerprint did originate from a particular organization using their public key (e.g., the interface was indeed developed by a reputable free software organization using a high standard of IT security), or can be used to indicate that there is authorization to use a particular fingerprint (e.g., one that causes a transformation as well using a proprietary interface). In this example, an independent development company that specializes in developing interfaces can create a reusable interface that allows for interconnections between interfaces from two different proprietary companies. The independent development company may require a fingerprint that is established using a private key that the independent development company created and sold to various organizations, and the system can be configured to validate and verify this before allowing for the transformation at the middleware system level followed by the routing to the destination.

The transforming of the new message can include generating a new cryptographic signature for the transformed new message and appending the new cryptographic signature onto the transformed new message to indicate compatibility. The signature can be appended in different ways, such as through adding fields to the data, adding metadata in the form of header information, among others. The transformation can happen at various times and stages of the communication, for example, encapsulated by the sending device, or the sending device sends a payload when is then encapsulated by the middleware system before loading into the buffer and routing to the target device.

To add new computational elements and couple them to cryptographic identifiers (e.g., registering a new class of MailServer interfaces), in some embodiments, a new schema for a new computational element is received and a new cryptographic identifier can be appended to the set of cryptographic identifiers based on a cryptographic representation of the new schema.

In a variant embodiment, the system can also be utilized as a mechanism for interface adoption and re-use. For example, if a third party has invested resources into developing a custom interface that is able to allow for intercommunications between two different services (e.g., a transformation that maps the various fields and/or code that implements changes to the messages for processing), the third party may choose to make such custom interface available for usage by other parties communicating over the system.

The fingerprint may be exposed by the third party and provided to the communicating parties (or just one communicating party). When the fingerprint is used by either party (either to indicate how a message should be sent or how a message needs to be received), the system can identify that a transformation is required to convert the message from a first type to a second type, and implement the transformation accordingly. In this example, the sending or the receiving party would not have to undertake the expense and the cost to write their own custom interface.

In another variant embodiment, the system can be used for interface discovery. When a new device is registered for communications across the system, the new device may undertake a discovery process where either a program may be run to identify all compatible services that are in use and generate corresponding fingerprints if any are new, or the device simply provides a list of fingerprints indicating how and which messages are to be transmitted, received, or processed by the device. The system may log these fingerprints on the system so that another device looking to communicate with the new device is able to identify whether communications will be compatible or incompatible. If incompatible, in accordance with an embodiment, if a custom interface is made by a third party, as noted above, the fingerprint of the custom interface can be used to conduct a corresponding transformation to allow for interoperability without re-developing a custom interface.

A marketplace can be provided for custom interfaces, according to some embodiments, where automatic counting of uses and/or remuneration processes can be utilized (e.g., a custom interface app store using cryptographic fingerprints).

In another variant embodiment, the system may be configured to require specific adherence to at least a minimum set of fingerprints before allowing device communications across the system. This, for example, can be used to require adherence to minimum cybersecurity requirements (e.g., only certified interfaces can be used that are known to include SQL injection avoidance mechanisms), or to require adherence to a specific technology stack or communication standard (e.g., a hospital network requiring that all communications for hospitals within the network be set up based on their specific interpretation of HL-7 to encourage data integrity such that a patient seen at one hospital can have consistent data if then seen at another hospital).

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIGS. 4A, 4B, 4C, 4D, 4E, 4F, 4G, 4H, 4I are example representations of various computational element levels that can be used to generate fingerprints in relation to an example implementation, according to some embodiments.

FIG. 11 is an example Specification and Description Language (SDL) snippet showing a series of definitions that each have fingerprints, according to some embodiments.

DETAILED DESCRIPTION

An improved computational approach is described in various embodiments. The approach includes corresponding systems, methods, computer readable media (e.g., computer-based articles of manufacture).

Figure 1A:
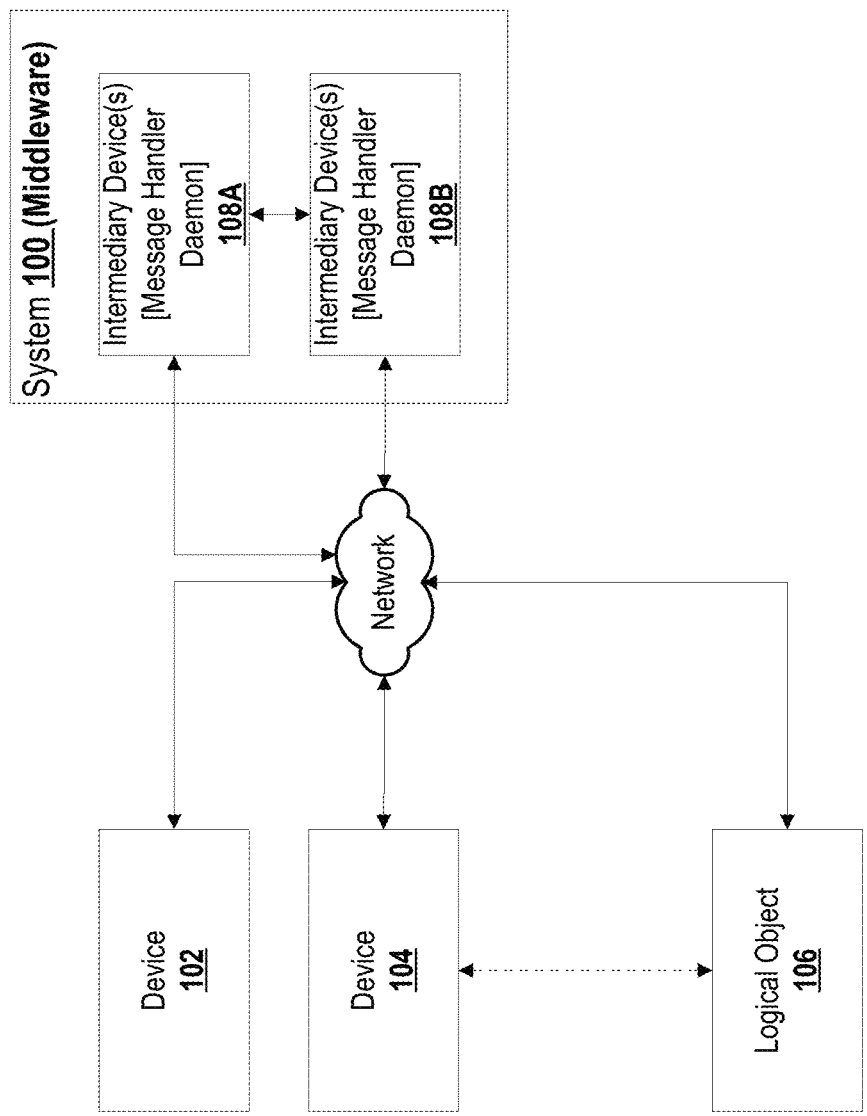
FIG. 1A is a block schematic of an example computational system configured for data communications, according to some embodiments.

FIG. 1A is a block schematic of an example computational system configured for data communications, according to some embodiments.

The approach can be implemented as a computing system 100 that provides an improved computing intermediary layer (e.g., "middleware"). The computing layer is a set of message handler components which can be used for coordinating messaging between devices 102, 104 (or within devices) and/or logical objects 106 (e.g., inter device or intra device communications). The computing layer is effectively a set of intermediary devices 108A, 108B, such as routers, switches, switching circuits which provide messaging services to the connected devices.

The messaging services can include inter device communications, intra device communications, among others, and the messaging services can include queuing/stacking/storing of messages in message buffers for asynchronous communications, handshaking protocols, message transmission confirmation/acknowledgement receipt, error correction code implementation, among others. The messaging services can operate, for example, a message-oriented middleware (e.g., as a daemon process configured for continuously intercepting and processing messages). Messages can include data messages, interrupt signals, control messages, etc. For example, the proposed messaging middleware can be used in respect of different devices in an "internet of things" topology (but is not necessarily limited so). In other embodiments, the messaging middleware can be used in a large, evolving, scalable architecture for an enterprise organization.

The messaging services are particularly important where there is a high degree of complexity in the types of interfaces that are used to either encapsulate or process messages. For example, the devices may be a heterogeneous mixture of different devices that were built for different stacks, or built for different generations of systems (e.g., legacy COBOL-based systems) that need to interact with one another.

This issue is particularly prevalent in enterprise-level organizations as complex backend computing infrastructure is built piecemeal over a number of computing technology generations as the organization scales. In another example computing context, the middleware aspects described herein can also be used in relation to smart home/internet of things applications where there are a potentially large number of heterogeneous devices that need improved communication services (e.g., where basic point to point communications are no longer sufficient).

The computational approach described herein is directed to an improved protocol for data message encapsulation and routing as between devices 102, 104 and logical objects 106 (e.g., caller/callees). In the example of FIG. 1A, the logical object 106 is a flexible reference, such as a pointer (shown in dashed lines), that is used to flexibly associate a device with a particular target callee (or caller). For example, the logical object 106 could relate to a particular user (as opposed to a device), and messages to/from the logical object 106 are instead of a specific device, such that as the user moves around and uses different devices 102, 104, the messages to/from the user are routed accordingly.

The computing system can be one or more servers, which can operate in conjunction with one another to provide an improved message coordination/routing platform that operates to enable various components of a distributed system to communicate and manage data. The computing system is adapted to enable interoperability and improved communication flows to simplify and improve the security/robustness of inter device communications.

An illustrative, non-limiting example may be provided in the context of a mail server. There may be different types of interface protocols for different technology stacks, such as the Microsoft Exchange™, IBM Lotus™, and Google Mail™, and Yahoo Mail™. While each of these technologies may ostensibly operate using the Simple Mail Transfer Protocol (SMTP), for the purposes of this example, each of these technology stacks use a different non-standard, potentially proprietary mail protocol with custom methods in addition to SMTP, effectively providing non-standard variations to their mail APIs.

In this example, each organization has invested significant time and effort into improving on the underlying interface definition, but as a result, the interface operability has deviated from a common standard and there may be different data message/processing schemas being used and messages from one device may have processing difficulties when sent to another device. The technology described herein can be provided to control a technology stack that resides on each device, which then can interconnect to another controller for another technology stack on remove devices (e.g., inter-device communications), or internally within technologies provided in a device itself (e.g., intra-device communications).

The system is configured to alleviate the above technical challenges by implementing a computer implemented method for coordinating data messaging. Specific technical approaches are described that provide a practical mechanism for improving data communications through reducing interoperability issues using cryptographic identifiers. The system provides a computing middleware service that utilizes an elegant communication coordination approach where the cryptographic identifiers are used for various purposes, such as robustly ensuring security/compliance adherence, or technical adherence, without incurring significant technical processing costs (e.g., as compared to a point-to-point interoperability validation solution). The routing control, buffering, and message transformation computing services operate in concert to provide an improved computing mechanism that can be established as a middleware platform.

In an enterprise level embodiment, a set of computing servers in one or more data centers which coordinate communications as between devices can be provided. In a small-office/home level embodiment, the embodiments described herein can be provided as a software module or circuit in a networking controller, such as a router, a switch, or a hub that controls intercommunications, for example, as between different in-home devices, such as printers, scanners, lightbulbs, motion sensors, cameras, refrigerators, switches, air conditioning, heating, mobile devices, laptop computers, among others. This can work within a local area network or multiple connected local area networks.

In a larger scale embodiment, the system can be provided in the form of a major, global scale communications routing controller provided in the form of a decentralized set of computing systems, for example, similar to the Domain Name System (DNS). In the larger scale embodiment, the system can be utilized for communications across multiple different networks, such as controlling communications across the Internet or a large wide area network (e.g., providing intercommunications across multiple hospitals networks and their associated medical device service providers).

Figure 1B:
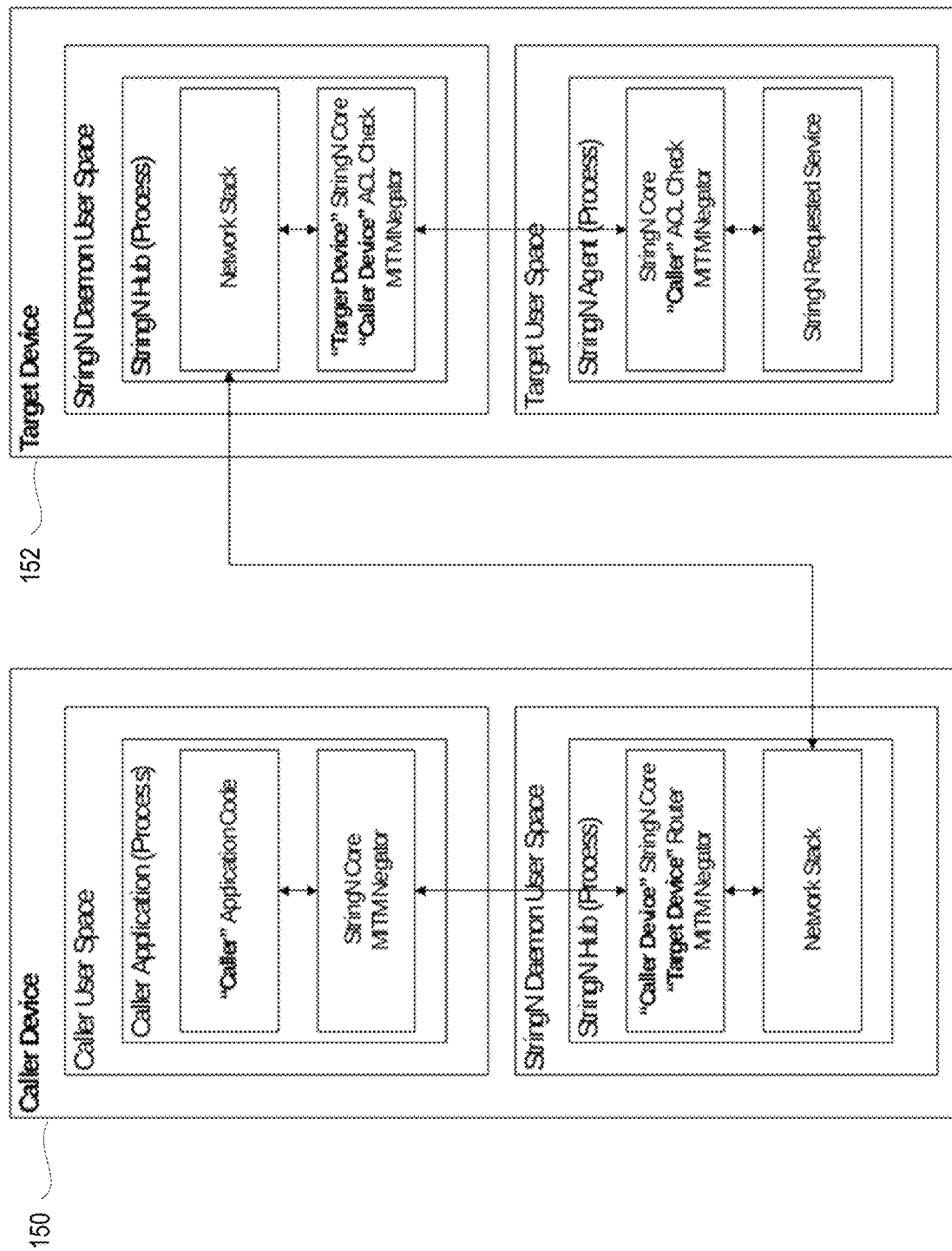
FIG. 1B is a block schematic diagram of a variant implementation, according to some embodiments.

FIG. 1B is a block schematic diagram of a variant implementation of the system 100, according to some embodiments.

In this variation, the system 100 is provided as a process that operates alongside user-spaces (e.g., process-spaces) in a segregated computing environment (e.g., computing sandboxed containers). The user-space architecture can be, for example, a segregation of virtual or other memory to provide memory protection and hardware protection by segregating code execution by preventing access by memory of other user-spaces by corresponding processes unless corresponding privileges are provided. Accordingly, there may be multiple user spaces and they may be configured to communicate with one another through specific communication channels and protocols having corresponding privileges and/or authorization.

In FIG. 1B, there are two devices represented. One left of center, one right of center. Within the left device, there are two blocks that represent separate user-spaces. Inside a particular user/process space, processes do not have access to another process space, unless root access is provided, segregating the spaces. For example, a process cannot conduct a query into another account's related processes as they are walled off. There can be, for example, one user-space for the client app, one user-space for the client hub, and on the target device, there can be have one user-space for the target hub and one user-space for the target agent.

Caller Device 150 can have a system 100 operating thereon as a process (StringN Agent user space process, for example, under the OS user space that belongs to the Caller Identity, one or more per user space when using StringN). The agent makes calls using its Caller Identity, targeting a Target Identity and Target Device. Call is delegated to its local StringN Hub.

In this example, the StringN Hub user space process (one per device) uses its Caller Device Identity to pass the message the Target Device's StringN Hub. Calls to a StringN Authority Server and a proxy may be required.

Target Device 152 can have another system 100 operating thereon as a process (StringN Hub user space process (one per device) uses its Target Device Identity to pass the message the local Target Identity's StringN Agent). The StringN Agent user space process of target device 150 (under the OS user space that belongs to the Target Identity can be configured to identify the ACL for the context of the Caller Identity and the Caller Device Identity for access to the requested Service. If the caller has a role that has been granted permission, then the agent looks further to the ACLs for the specific App, Class, Interface, & Method requested. Only if the role grants permission will the Service be loaded into memory (if not already loaded), invoked, and the result returned.

The system can be adapted to require a genuine Caller/Target context for all calls. For example, the Caller/Target state while running on a device is the stringn-context, and network calls have a server address (may need a DNS lookup) to route to, and (in many scenarios) a Caller identity context. The StringN process also has a Target identity, which can be an individual or a device. In some embodiments, a StringN process identity is never a routing address nor a means to identify a method call. In StringN, a Caller and a Target are StringN identities. A call from the StringN process can route to many devices, invoking services under a Caller/Target context. This allows routing to be independent of the Target until the call reaches the intended device. To clarify, an StringN process call is primarily a CallerDevice/Caller/Target/TargetDevice context, with the inner Caller/Target wrapped with the external CallerDevice/TargetDevice.

Decentralized roles and ACLs can be defined in the StringN process-service definition of each method, interface, class, application, and service. The ACL store for each device is within the native OS environment associated with the target identity, away from the hubs' native OS environment.

The method for communication includes establishing a CD (caller device)<->TD (target device) communication channel.

(i). Routing detail can be handled by requesting address information by querying the TD's authority server. If the TD is named device1@example.com, then the authority server for example.com is called to request address information. (ii). Initiate CD<->TD network channel to TD. TD will use its ACL from its own user-space to determine if CD has rights to create the (preferably encrypted) channel.

The method then continues by establishing a tunnel for a C<->T communication channel through the CD<->TD connection.

Caller to target (C2T) packets can be routed as follows: (i). C creates the (preferably encrypted) C<->T packet in the user-space of the caller. (ii). Forward the packet to the CD (often running in it's own user-space). (iii). The CD forwards the packet to an existing (or creates a new) CD<->TD communication channel. (iv). The TD receives the message and forwards it to the T (often in its own user-space). (v). T verifies the ACL for the call, and if allowed, passes the call to the requested StringN Service.

T2C packets will be routed as follows:

(i). T makes use of the (preferably encrypted) C<->T packet in the user-space of the target. (ii). Forward the packet to the TD (often running in it's own user-space). (iii). The TD forwards the packet to an existing (or creates a new) CD<->TD communication channel. iv. The CD receives the message and forwards it to the C (often in its own user-space).

Distributed Roles and ACL: The roles are defined by each system 100 service. The ACLs can be stored in each process space where a system 100 Core stack is running. The Hub has ACLs for device level permissions and the process agent (in each user space) has ACLs for remote user and device permissions.

As described herein, there may be improved Man in the Middle (MITM) protection at the server, as the process Hub daemon ("stringn-hub") accepts the network call and serves as a proxy. The hub is unable to inspect the inner message beyond the ability to verify and forward between the Caller and Target accounts. The hub proxies secure packets to and from the Target through an stringn-agent hosted service within the local operating system's logged in environment. The user identity certs, access control, and local data stores can only be accessed within the 'OS User Context'.

In the variation shown, a full version of the middleware process core of system 100 resides on or is computationally coupled to each machine in the loop. The system 100 functionality can be fully distributed.

In FIG. 1B, a path of a call, from a client application, is shown to the local hub, to the remote hub, and the remote agent. This can also be from the client application, to the local hub, and to a local agent on the same device. Variations are possible with different hubs, or where a single hub process is shared either residing on one of the two devices, or in another embodiment, residing on a remote device that is coordinating communications between the devices.

In an example implementation, there can be one or more hub processes running per device, much like an IIS webserver. In this variation, the hub process is designated as a StringN implementation (e.g., system 100). For illustration, IIS runs under the IIS_USER account, and a StringN Hub would run under a STRINGN_USER account.

A user application that uses StringN, when compiled, would link into StringN, for example, using a DLL to bring in the stack. When a client application communicates—it travels from the client process to the client device StringN Hub (which is in another user space). The StringN Hub might need to talk to an authority server to learn the address of the target device. The Caller Hub then communicates to a remote device through its Target StringN Hub. The remote device StringN Hub looks at its own access control level (ACL). It determines if it is allowed to receive communication from this caller device, etc. But once it decides it is willing to send it through, it will look for the userspace StringN Agent for the target user.

If it can find that Target StringN Agent running, it has a path to communicate to the agent. The Target StringN Agent will check its own roles within its user space associated with the service you want to invoke (this is associated with the target user), it makes a determination before it loads it into memory. Is the caller able to invoke this service on the target? If so, is the caller allowed to invoke the requested APP, CLASS, INTERFACE, & METHOD? If the caller are allowed, then it loads it into memory the target's service that the caller tried to invoke and then passes the call through.

The roles can be connected with the service, and the access control references the service. There can be access control established in each and every user space, and within each hub environment as well. The hub ACL can be more device access control. The ACL at the user are likely more caller/target rights, and can be implemented in a distributed approach.

In the event of a man in the middle (MITM) attack—consideration a situation where if someone was able to hack a machine that allows them to hack into the hub. Now they're running under the credentials of the hub. While they do that, they can see that a message is trying to be sent from a caller to a target. When it is doing this, it can't read the messages. It was encrypted in the caller's user space before sending—the hub is in a different user space so it cant open—also can't redirect the message to another user, because the whole data object can be signed as from an originator to a target—the originator sends the message it to a third party device, but the third party device is unable to process it without the correct cryptographic codes. On the server side—the hub providing system 100, in some embodiments is unable to inspect the contents of the message (e.g., message payload), and is configured to simply delegate to the target user. The system 100 can block the messages, but in this embodiment, the system 100 can't read them or change them.

In another scenario, a malicious user is able to hack a user-space. When a user logs into an operating system and opens a phishing email, and has a DLL injected into every process of the user-space. When that happens, the malicious user can now read the messages and send out bad messages and the like because they've taken the identity and the user space. If this is a machine with one hundred users, the malicious user cannot infect the other ninety nine users. Accordingly, there is limited MITM protection for the unhacked user-spaces.

Figure 1C:
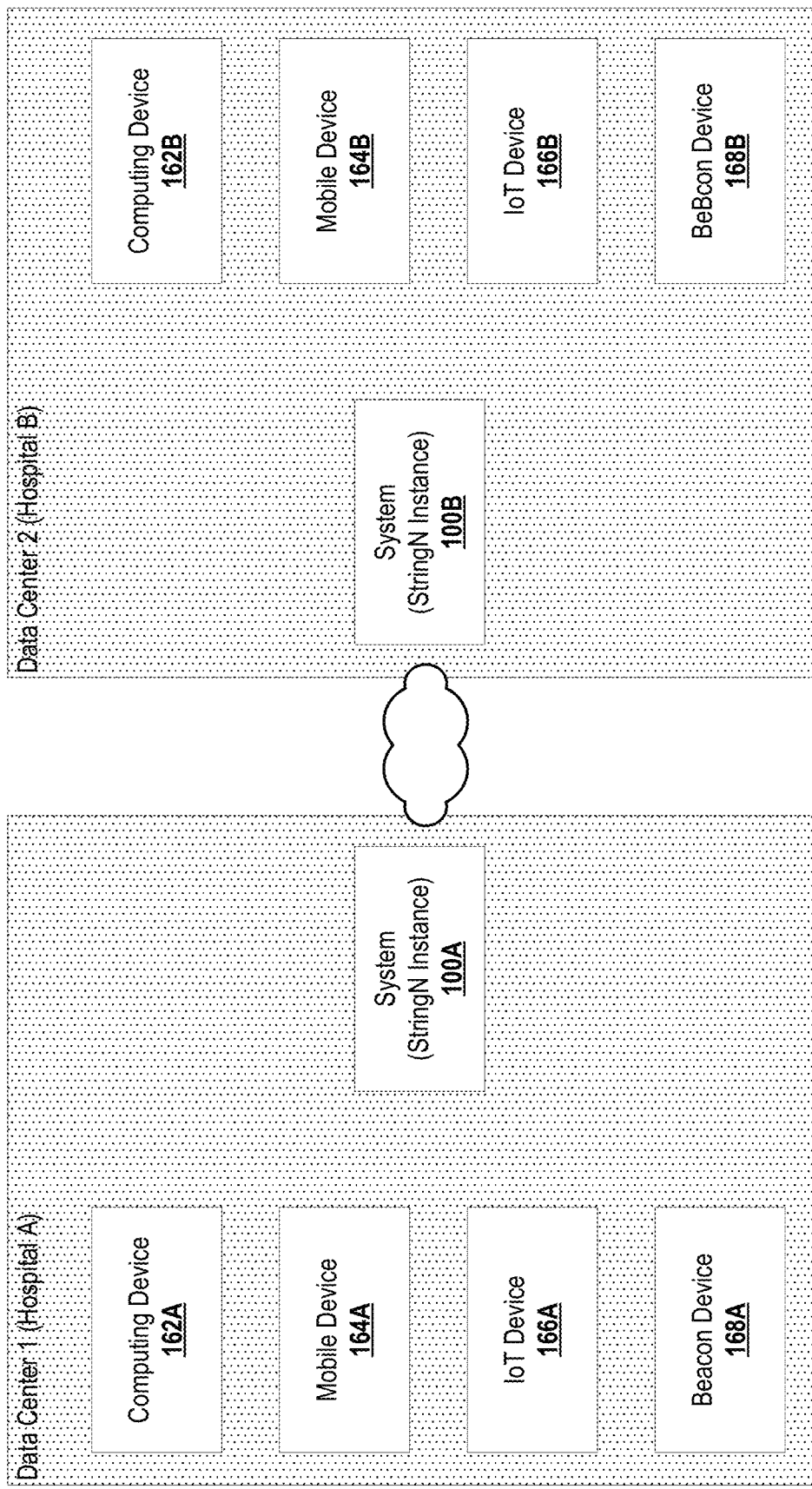
FIG. 1C is a block schematic diagram of a variant implementation where separate instances of the system are provided for communications between two secure networks, in this example, Hospital A and Hospital B, according to some embodiments. Each of Hospital A and Hospital B have their own instances in this example.

FIG. 1C is a block schematic diagram of a variant implementation where separate instances of the system are provided for communications between two secure networks, in this example, Hospital A and Hospital B, according to some embodiments. Each of Hospital A and Hospital B have their own instances in this example.

In FIG. 1C, there are two data centers, denoted as data center 1 and data center 2. Each has their own sets of computing devices 162A, 162B, mobile devices 164A, 164B, IoT devices 166A, 166B, and other types of communications devices, such as beacon devices 168A, 168B. These devices are coupled to the corresponding system 100A, 100B such that the system 100A, 100B is a local messaging middleware platform that controls inter-device messaging within the trusted network.

Within the virtual confines of the trusted network for each of the data centers, the corresponding systems 100A, 100B handle secured communications, tracking user accounts, computational elements, roles, etc. using cryptographic fingerprints, which can be stored or maintained on a coupled data storage for reference. Every time a new computational element is created, modified, or removed, the data storage is updated with a new cryptographic fingerprint. Each device can have an identifier fingerprint (e.g., Dr. Smith's laptop, oxygen saturation level sensors 1-50), and similarly, user accounts (e.g., Dr. Smith, Oncology) and data process (e.g., batchReportGenerator) accounts can also be coupled to a cryptographic fingerprint, which in some embodiments, can also be used as an address of the device, user account, or data process.

The cryptographic fingerprint, in some embodiments, is generated through a hashing of characteristics of the computational element (e.g., the binary code representing the computational element, the source code prior to compilation, along with a nonce value to maintain uniqueness if using an industry standard hashing mechanism), and becomes automatically invalidated if the underlying code Is changed of the computational element. For example, if a callable method is changed (e.g., to add a new argument, to add an exception handler, to add a new input field), the earlier cryptographic fingerprint is no longer valid and a new cryptographic fingerprint would be created. Similarly, if a user account changes characteristics, such as an address, a userID, a processID, etc., an updated cryptographic fingerprint may be required. Modification of the cryptographic fingerprint may be controlled, for example, through validation of certificates by a centralized certificate authority server.

The data storage for each instance of the system 100A, 1008 tracks permissions associated with each of the cryptographic fingerprints (e.g., pwd function is call-able by all roles, but fdisk function is only callable by administrator roles). Other characteristics can also be tracked, for example, an owner identifier (e.g., a fingerprint of a user or a userspace).

The owner identifier can be used, for example, to automatically log how many times a particular fingerprint was used or by whom (e.g., John Smith's video conversion method was called 150,000 times), or for contacting the owner when there is an issue with the operation of a particular fingerprint (e.g., based on a number of times a particular call fails or an exception handler is run). A running audit log may be maintained, or in some instances, a counter variable is incremented with every procedure call. An example log entry can include (Caller, Target, Caller Device, Target Device, RequestedComputationalElement, Payload).

A counter variable is useful in situations where maintaining an example log is too computationally onerous or there are privacy considerations. The counter variable can be used to track demand for particular computation resources or popularity of particular functions (e.g., how often something is used), and can be utilized, for example, by downstream data processes to control the allocation of distributed computing resources, such as virtual machines processors, storage, high speed network interfaces, among others.

The demand for particular computation resources or popularity of particular functions can also be tracked for remuneration, for example, in allocating incentives or credits to user accounts representing originators or maintainers of particular computational elements.

The data storage for each instance can also track characteristics assigned to various fingerprints, such as interrelationships between fingerprints (e.g., this fingerprint inherits from, extends to, encapsulates, is-a-type-of, has-a), and/or a Boolean or integer value associated with whether a particular fingerprint has been validated or checked for adherence to a particular computational standard or requirement. This is useful especially in secure data center environments, where ideally every computational element is required to adhere to a particular best practice, such as schema standards, cyber security requirements from the OWASP foundation (e.g., all interface input data fields hardened against vulnerability to SQL injection, automatic lock out and automatic step up verification required when password failed more than 3 times, sensitive information always converted using bcrypt and never stored in plaintext). The hierarchy of interrelationships between the fingerprints can be traversed by the system 100A, 1008 to automatically set certain characteristics. For example, if a class includes five methods, and each of the fingerprints of the five methods are listed as adhering to cybersecurity standards, the class itself can automatically be denoted as adhering to cybersecurity standards. In variant approach, the classification can also be top-down—if the class is noted as adhering, all of the children methods can be denoted as adhering.

The data storage for each instance can be established for rapid lookup, and the fingerprints and their associated characteristics can be stored, for example, in an indexed array that is adapted for rapid traversal or search. In some embodiments, particularly high-demand lookups can be maintained on a faster cache mechanism (e.g., a L1, a L2, or a L3 cache).

Each data center in this example hosts a separate instance that provides a message hub for internal communications within the network. For example, a computing device 162A may wish to send a data message to IoT device 166A, Each system 100A and 1008 holds a local permissions and fingerprint list, indicating all of the possible messaging functions and their characteristics. For inter-data center communications, the system 100A and 1008 are adapted to intercommunicate with one another with data messages without exposing fully their underlying lists of capabilities, permissions, user accounts, and device identifiers.

Each of the systems 100A and 1008 can be configured to include a public and a private set of available fingerprints, the public set discoverable by the counterparty system to indicate computational elements that can be interacted with. In some embodiments, the public set of fingerprints may include a set of alias fingerprints derived from the private set of fingerprints to provide an enhanced level of security.

Figure 1D:
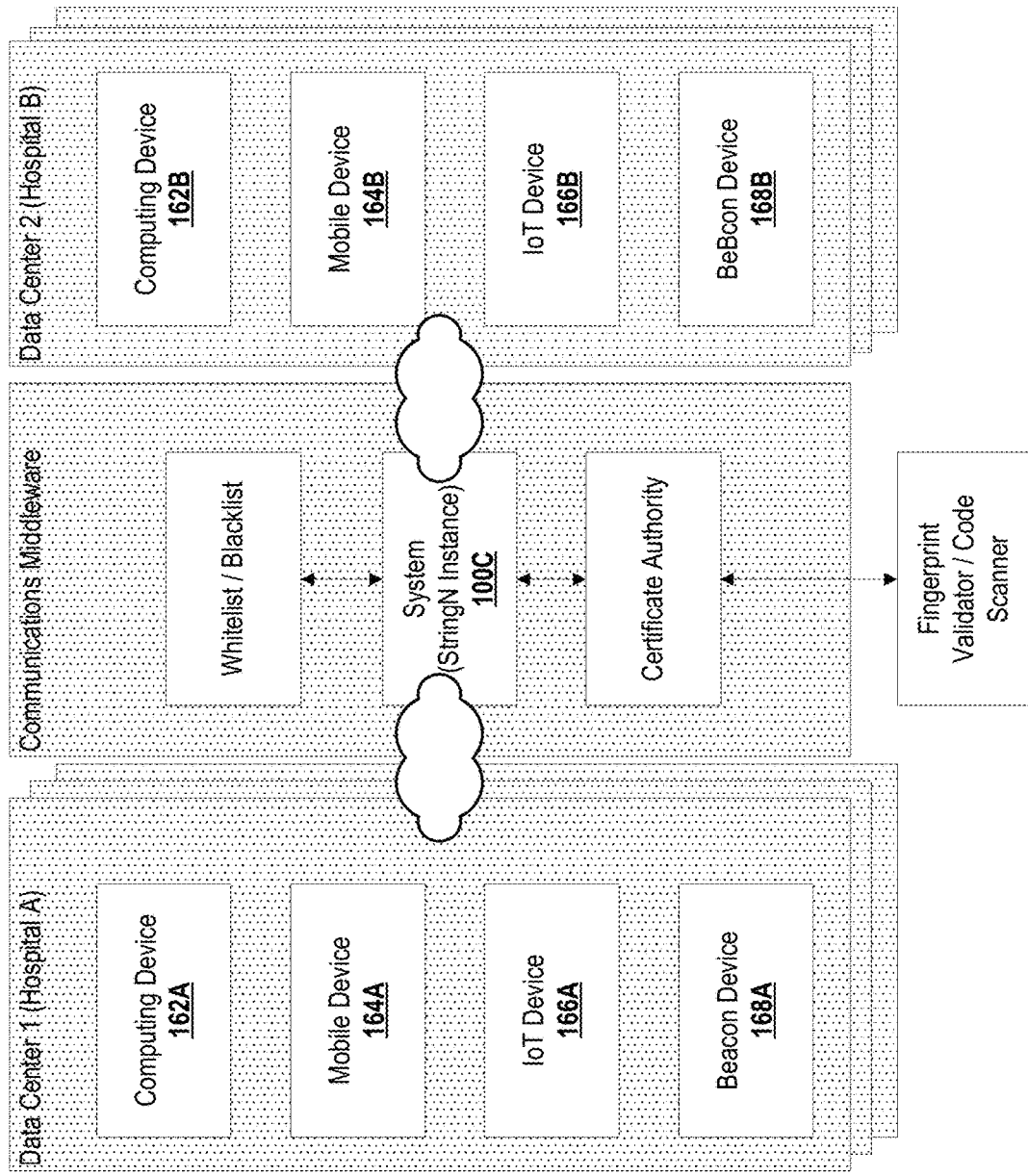
FIG. 1D is a block schematic diagram of a variant implementation where shared instances of the system are provided for communications between different secure networks, in this example, Hospital A and Hospital B, according to some embodiments. Each of Hospital A and Hospital B communicate to one another across a shared set of instances in this example.

FIG. 1D is a block schematic diagram of a variant implementation where shared instances of the system are provided for communications between different secure networks, in this example, Hospital A and Hospital B, according to some embodiments. Each of Hospital A and Hospital B communicate to one another across a shared set of instances in this example that operate as communications middleware.

The computing devices 162A may transmit a message to the system 100C for ultimate delivery to a logical target (e.g., where the system 100C determines the ultimate machine target), or to a specific target device (e.g., mobile device 164B). The messaging, for instance, can be asynchronous or synchronous, where the messages may be stored in a buffer and forwarded only when the target device is available, and in some embodiments.

As the data centers may be utilizing different schemas and/or different API types that may not be directly compatible with one another, in some instances, bridging interface computational elements fingerprints can also be utilized to call interface methods for transforming data messages from one schema to another for an ease of transformation of messages for downstream processing. In some embodiments, the system 100C is configured to track interface and computational element compatibility in a maintained lookup table of fingerprints and associated devices and/or computational elements, and automatically determine when a bridging interface is required (e.g., by looking up whether the target device can handle data messages utilizing specific fingerprints, and if not capable of doing so, automatically identify a fingerprint of an approved bridging interface for converting the message).

If a centralized system 100C is utilized between the data centers, as shown in FIG. 1D, the system 100C may also be configured also track adherence of computational elements to various schema standards and security standards, and maintain an approved whitelist or a disapproved blacklist of fingerprints. The whitelist or blacklist can be stored in a data structure that is maintained by a third party auditor or security organization. A whitelist could be supported by a certificate authority that grants certificates to specific approved computational element fingerprints only, which must be re-validated over time to maintain pendency else face removal from the whitelist.

As any change to a particular computational element could cause the fingerprint to potentially change, the fingerprint whitelist, in particular, is a strong mechanism to deter the usage of unverified or unsafe computational processes without imposing too heavy of a computational burden on the validation of data messages and invoked/called computational elements as they are sent from source devices to target devices. This system is particularly useful in high security situations, such as computing devices that operate with personal information, health information, operate critical infrastructure (e.g., power grid software, transportation networks). The cryptographic fingerprints are also useful in avoiding unintentional errors that occur from changes in software specifications, such as the casting of a variable type or formatting for a field (e.g., metric measurement value input or an imperial measurement value input).

Embodiments are not limited to cybersecurity mechanisms, other validation is possible as well. For example, the fingerprint validator entity could include a computational system that is adapted for automatically parsing source code or object code to assess a potential for a copyright infringement or a license infringement (e.g., code copied from the Internet without proper rights or attributions, or under a restrictive license that is not permissible), and blacklist the fingerprint. Conversely, the fingerprint validator entity could be configured to only whitelist fingerprints that have been specifically approved by the automated screener system.

Figure 2:
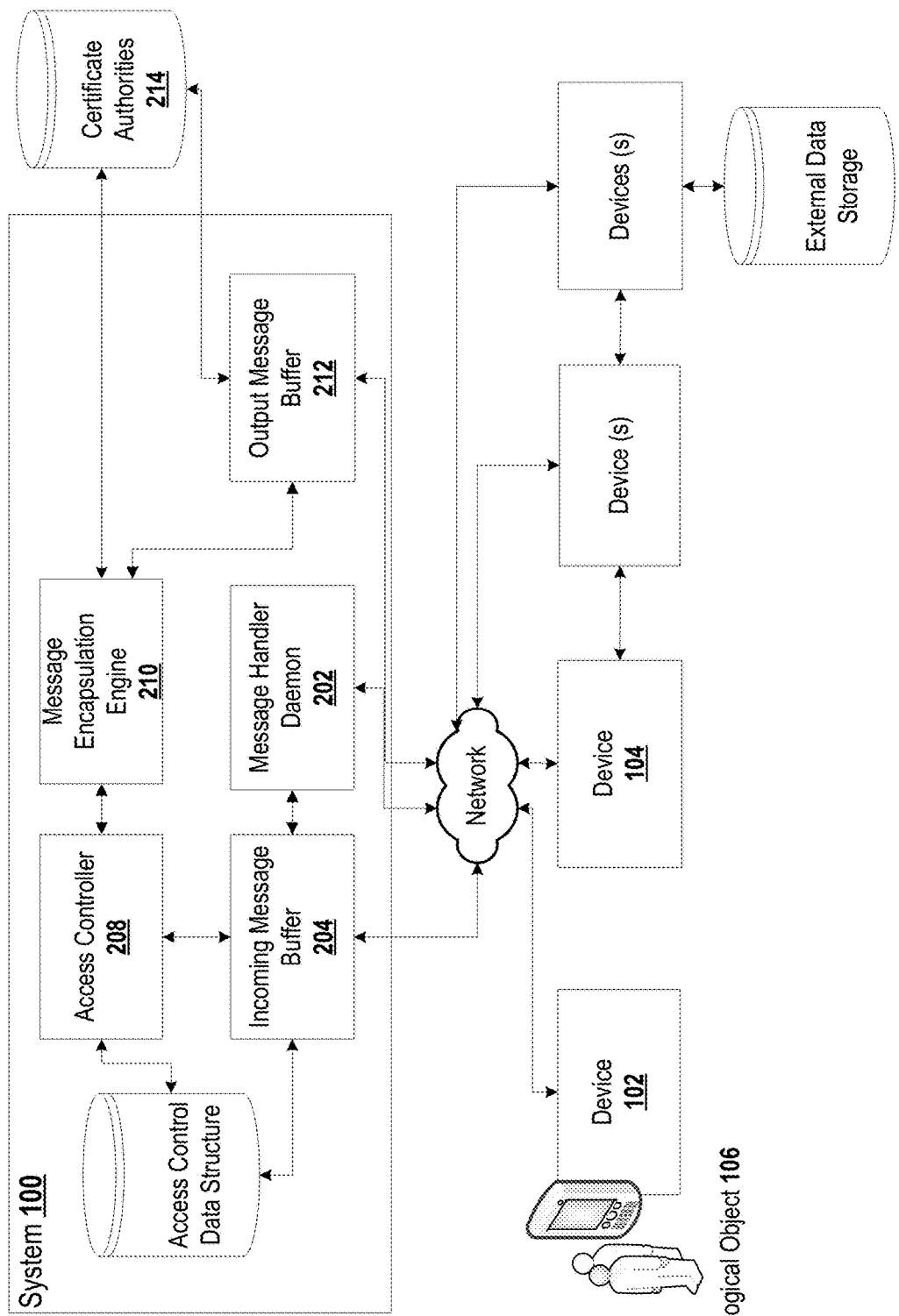
FIG. 2 is a block schematic diagram of example computing components that can be utilized to implement the system configured for data communications, according to some embodiments.

FIG. 2 is a block schematic diagram of example computing components that can be utilized to implement the system 100.

The system 100 can include computing components, such as a message handler daemon 202 configured to receive and process incoming messages, an incoming message buffer 204, a message transformation engine 206, an access controller 208, a message encapsulation engine 210, and an output message buffer 212, according to some embodiments. These computing components can be implemented using one or more physical computer processors, and the computing instructions (e.g., software modules) provided in the form of machine interpretable instruction sets that can be executed to perform steps of various methods described herein.

The system may include one or more certificate authorities 214 that are utilized for authenticating messages and/or interface usage/adoption, and these certificate authorities can be used during device/interface onboarding or discovery to establish cryptographic authentication mechanisms for later usage. Other components of the system can include load balancers 216, network interface controllers 218, web interface controllers 220, cryptographic engines 222, among others.

Figure 3:
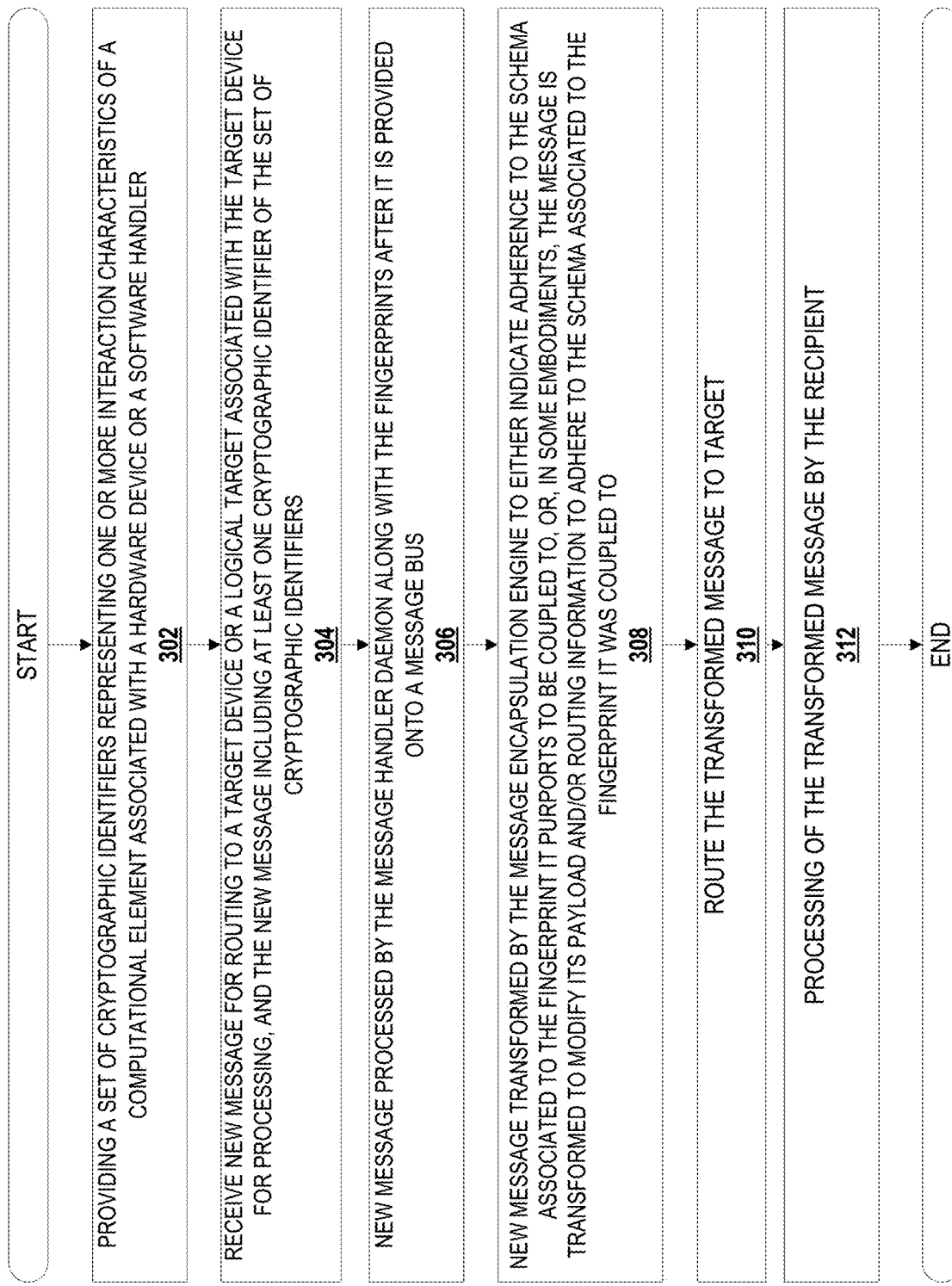
FIG. 3 is a method diagram showing an example method for data communications, according to some embodiments.

FIG. 3 is a method diagram 300 showing an example method for data communications, according to some embodiments.

In a first embodiment, the approach includes, at step 302 providing a set of cryptographic identifiers representing one or more interaction characteristics of a computational element associated with a hardware device or a software handler.

These cryptographic identifiers, for example, can be referred to as "fingerprints", and as noted below, can be used to indicate whether a message is processed, modify how the message is processed, and in some embodiments, modify the message itself. These cryptographic identifiers are utilized to provide a readily verifiable but difficult to reverse secure mechanism for authenticating the metadata or header data indicative of adherence (or desired adoption of) a particular computational element schema.

The new message is received at 304 for routing to a target device or a logical target associated with the target device for processing, and the new message including at least one cryptographic identifier of the set of cryptographic identifiers. For example, the new message may be appended with a fingerprint of a desired interface that is indicated to be adopted (e.g., a target interface type) or it can be appended with the fingerprint of the interface the message is already designed to be processed using. The fingerprint may be stored, for example, as header information on a data packet storing the data message as a payload, or provided directly into the payload itself.

In the simplified MailServer example, the message can be received that indicates that this is a NewMailMessage (target IP address, payload) having fingerprints F1, F2, and F3. Fingerprints F1, F2, and F3 in this case show that NewMailMessage is configured in adherence with interfaces from software stack1, in particular MailMessageClassStack1 (F1) and in adherence with MailMessageClassStack1.Interface1 (F2) and MailMessageClassStack1.Interface1.CreateNewEmail method (F3). The fingerprints can be various types of message hash digests.

At step 306, the new message is processed by the message handler daemon 202 along with the fingerprints after it is provided onto a message bus (e.g., provided into an input message buffer). The message handler daemon 202 identifies, for example, by comparing the fingerprints F1, F2, and F3 against a reference data structure, a corresponding computational element corresponding to the at least one cryptographic identifier of the new message for routing to the target device.

The computational element, as identified, can include various types of schema to be adhered to, such as enumerated types, structures, parameter/variable types (e.g., floats vs. shorts, shortint vs. longint, arrays, Booleans, linked lists, defined variables), methods for adherence (e.g., a C/C++ method), or groups of methods. The computational element may also identify, at a higher level, schema adherence more broadly to classes (collections of one or more interfaces), applications (collections of one or more classes), services (collections of one or more applications), packages (collections of one or more services).

At step 308, the new message can be transformed by the message encapsulation engine 210 to either indicate adherence to the schema associated to the fingerprint it purports to be coupled to, or, in some embodiments, the message is transformed to modify its payload and/or routing information to adhere to the schema associated to the fingerprint it was coupled to.

The message can be transformed, for example, through appending metadata in the form of header information, modifying the payload accordingly, digital signing using certificates held at certificate authorities 214, among others. The transformed message can then be placed into output message buffer 212 for routing to the corresponding target device or target callee. The buffer 212 can be configured to process routing rules, such as delayed routing, acknowledgement/confirmation protocols, asynchronous communication instructions, among others.

At step 310, the message can be processed by the message handler daemon 202 to either send the message as-is in the event that the message can be validated and the ability of the destination/target to handle the corresponding computational element is validated, or the message can be transformed so that it can be handled properly by the of the destination/target. The routing of the processed new message to the target device can include, for example, loading the processed new message on to a buffer associated with a message bus for asynchronous routing of the processed new message to the target device.

In another embodiment, the message can be simply rejected for transmission as it does not adhere to the correct schema/protocol as indicated from the cryptographic identifiers appended thereon.

As described herein, the cryptographic identifiers are useful in providing an elegant technical solution to issues relating with interoperability of heterogeneous devices attempting to interoperate across heterogeneous or unknown protocols. The cryptographic interrelationships between the cryptographic identifiers in some embodiments can be used to indicate partial adherence to a particular protocol or schema, which is useful where a common framework is utilized but the common framework is customized differently at different levels in various implementations. For example, in HL7, a commonly used healthcare framework, the framework itself is customized by each practitioner hospital or hospital network such that some level of inconsistency arises from the particular needs of each hospital or hospital network.

The cryptographic identifiers described herein are particularly useful for enabling re-use of protocol transformation "bridge interfaces" that are developed as between parties. For example, in a large example scaled implementation, there may be twenty hospital networks collaborating across millions of devices, each using a customized version of HL7, having some commonalities in schema and some differences. The cryptographic identifiers can be referenced by system 100 and updated periodically (e.g., uploaded by the constituent organizations). In another embodiment, as new identifiers are encountered, they are logged by system 100 and a database of identifiers evolves over a period of time.

When the cryptographic identifiers are created at a particular element level of the schema/protocol, commonalities may have the same identifiers, but the higher level will not if the underlying elements are not all the same. For example, an interface 1 may include several methods, such as methods A-E.

The messages may be coupled with multiple cryptographic identifiers, which may be associated with different interface elements at different levels of the schema/protocol, and the message handler daemon 202 may identify that a new message is adapted to adhere to the schema of methods A-C, but not D and E. Accordingly, when the message is being routed to the target, the identified transformations (or non-adherence) can be noted. If interface 1's identifier is generated through a cascaded hash built fro the combinations of A-E, it can be immediately identified that the message does not adhere to the interface 1 as a whole.

Where an organization (e.g., a code developer) invests time and effort into creating an interface to bridge messaging between protocols/schemas so that they are able to communicate with one another, the system 100 of some embodiments is adapted to encourage the re-use of this bridge interface by storing the corresponding transformations in a backend data structure, or referencing such transformations.

The transformations can include specific rules for transformation, such as conversion of parameters or variables from one type to another, re-arrangements of payload aspects, re-arrangements of arguments, among others, or in some embodiments, combinations or separations of specific data elements in the message handling or routing. More complicated examples include wholesale transformations of messages or payload types, such as recognizing that the target can only process AVIs, so that the entire message payload is transformed from MPEG to AVIs.

The re-use of bridging interfaces and/or transformations is implemented through the use of identifiers and/or access control lists, which can be used to control which targets or which originators are able to utilize which bridging interfaces and/or transformations. This can be used, for example, to track for remuneration when a particular bridging interface and/or transformation is used so that the originating developer can be paid for his/her efforts.

In some embodiments, instead of (or in addition to) controlling which targets or which originators are able to utilize, the access control lists can be used instead to require the use of specific which targets or which originators are able to utilize which bridging interfaces and/or transformations. This can be used, for example, to require adherence to transformations that are validated or known not to have security issues (e.g., have passed a security audit).

For example, a particular transformation or bridging interface may have passed a security audit indicating that there are no code injection vulnerabilities inadvertently introduced, or that the particular transformation or bridging interface has been tested over a large number of use cases, functional verification testing, etc. such that the outputs are known to be acceptable and process-able by the target. In another embodiment, adherence may require that specific error handling/exception handling protocols are adhered to such that a failure can be easily handled by the receiver.

The transformations may further include message routing characteristic modifications, such switching from best efforts delivery protocols to confirmation required (handshake) protocols, requiring sending within a timeframe, conversion into a broadcast or vice versa, etc.

FIGS. 4A, 4B, 4C, 4D, 4E, 4F, 4G, 4H, 4I are example representations of various computational element levels that can be used to generate fingerprints in relation to an example implementation, according to some embodiments.

In this example set of fingerprints, the fingerprints are automatically generated, and independently generated (i.e., the same ID will be generated regardless of where or when it occurs, which helps speeds the inquiry for the support of the Fingerprinted items and normalize the inquiry for the support of the fingerprinted items).

The fingerprints, as described in this specification, can be used to invoke the targeted code implementation at a SERVICE, APP, or class context, among others.

Example computational element levels include, for example:

PARAMs (e.g., a synonym would be a C/C++ method parameter or a defined variable)
METHODs (e.g., a synonym would be a C/C++ method)
INTERFACEs (i.e., a group of zero or more METHODs)
CLASSes (i.e., a group of zero or more INTERFACEs)
APPs (i.e., a group of one or more CLASSes)
SERVICEs (i.e., a group of one or more APPs)
PACKAGEs (i.e., a group of one or more SERVICEs)
ENUMs (i.e., an enumerated type)
STRUCTs (e.g., a synonym would be a C/C++ struct)

While a CLASS is synonymous to a COM CoCLASS in many ways, and a PACKAGE is synonymous to a COM Binary DLL/EXE, the APPs and SERVICEs are unique. A SERVICE can be a full fledged API to all components in a (usually) server application—e.g., a MailServer. An APP is a component of the SERVICE that could (arguably) support a client application with just the one APP or perhaps a combination of APPs, where the client application is not (usually) interested in the full function of the SERVICE(s) containing the APP(s).

Cryptographic identifiers, as noted above, can be considered "fingerprints", and are an improved mechanism for providing data communications middleware. For example, the fingerprints can be established in conjunction with a discovery mechanism 220, such that the fingerprints are registered onto a data structure of an access controller that can be referenced for identifying corresponding interfaces.

The "fingerprints" representing the set of cryptographic identifiers can be, for example, generated using cascaded hashing across a plurality of interface interaction layers such that the cascaded hashing provides a hierarchy of hashing interrelationships that can be utilized for validation that a lower cryptographic identifier belongs within a higher cryptographic identifier relative to positioning within the plurality of interface interaction layers. For the purpose of this disclosure, a fingerprint (sometimes referred to as an "IoTP" Fingerprint) is an ID to adapted to represent data such as the definition of a param, method, interface, class, app, service, package, enum, or struct.

This ID can be one of the following: (1) a hash (one way function) such as SHA256, MD5, CRC, or other hash algorithm; (2) a compressed representation of the data; (3) a generated value from a shared repository, such as a database index, guid, or random value. When referring to a 'hash' it could be replaced with any of the three ID cases listed above. When referencing the 'order'(ing) of Fingerprints, the rules to order can be left to the implementor as long as all users of the Fingerprints use the same order(ing) rules.

Note the characteristics of the following:
PARAM:
  A variable type, such as a 32 bit unsigned integer, a string, a blob of memory, etc.
  Optional attribute(s), such as 'in', 'out', 'in-out', 'retval', 'secure' or other to aid in marshalling data or storing data in secure memory locations. Note that the implementation can use other synonyms such as &(in-out), *(out), or the absence of an attribute to mean 'in'.
  An optional variable name.

Examples int32 a (the type is 'int32' and the name is 'a'. 'a' is an 'in' variable)
string &b (the type is 'string' and the name is 'b'. 'b' is an 'in-out' variable)
variant ['out'] c (the type is 'variant' and is an 'out' variable)
memory *d (the type is 'memory' (a blob) and 'd' is an 'out' variable)
double e! ('double' type, 'e' is an 'in' variable that should be stored in a secure memory location)
uint64 (type only. The type is 'uint64')
What are potential PARAM types?
variant (a variant can hold any any other PARAM type)
int8
uint8
int16
uint16
int32
uint32
int64
uint64
bool
float
double
string
datetime memory
array of variant
RESULT
What are the custom PARAM types?
enum
struct
Fingerprint generation of a PARAM:
  Use the name, type, and attribute to calculate the hash
  Create a string (toHashString) with the value "param\n"
  Concatenate the 'name' and a '\n'. If the PARAM does not have a name then use".
  If the type is not a STRUCT or ENUM, concatenate a string representation of a uint64_t cast of the 'type' enumeration and a '\n'. If the type is a STRUCT or ENUM, concatenate a string representation of the Fingerprint of the STRUCT/ENUM.
  Concatenate a string representation of a uint64_t cast of the 'attribute' enumeration(s) and a '\n'. Take the 'toHashString' value and hash it.
Method:
  A METHOD represents the definition of a (potentially) callable software method, consisting of a method name with a number of PARAMs and an optional return PARAM.

Examples test//the method 'test' has no params in, out, or returned from the method.
int32 foo//the return type is 'int32' and the method name is 'foo'. 'foo' has no additional params.
int32 min(int32 x, int32 y)//the return type is 'int32' and the method name is 'min'. 'min' has two 'in' parameters passed in, and 'y', which are both of type 'int32'.
bool getInitObject(variant *o)//the return type is 'bool' and the method name is 'getInitObject'. 'getInitObject' has one out parameter passed in, 'o' of type 'variant'.
uint64 getRemainingNotificationCount(uint64 notifyID)//the return type is 'uint64' and the method name is 'getRemainingNotificationCount'. 'getRemainingNotificationCount' has one 'in' parameter passed in, 'notifyID' of type 'uint64'.
Fingerprint generation of a METHOD:
1. Use the name and PARAM fingerprints to calculate the hash
  Create a string (toHashString) with the value "method\n"
  Concatenate the 'name' and a '\n'. If the METHOD does not have a name then use ".
  For each PARAM, concatenate a string representation of the PARAM Fingerprint and a '\n'. Take the 'toHashString' value and hash it.
Interface:
  An INTERFACE represents the definition of one or more METHODs.
  Example (in YAML, with comments) of the 'Logger' INTERFACE definition is provide at FIG. 4A.

Fingerprint generation of an INTERFACE:
Use the name and METHOD fingerprints to calculate the hash
Create a string (toHashString) with the value "interface\n"
Concatenate the 'name' and a '\n'. If the INTERFACE does not have a name then use ". Order the METHOD Fingerprints
For each METHOD, concatenate a string representation of the METHOD Fingerprint and a '\n'.
Take the 'toHashString' value and hash it.

Class:
An CLASS represents the definition of one or more INTERFACEs. Example (in YAML, with comments) of the 'Log' CLASS definition in shown at FIG. 4B.
Fingerprint generation of a CLASS:
Use the name and INTERFACE fingerprints to calculate the hash
Create a string (toHashString) with the value "class\n"
Concatenate the 'name' and a '\n'. If the CLASS does not have a name then use ". Order the INTERFACE Fingerprints
For each INTERFACE, concatenate a string representation of the INTERFACE Fingerprint and a '\n'.
Take the 'toHashString' value and hash it.

APP:
An APP represents the definition of one or more CLASSes. Example 1 (in YAML, with comments) of the 'Notification' APP definition is shown at FIG. 4C.
Example 2 (in YAML, with comments) of the 'Log' APP definition is shown at FIG. 4D.
Fingerprint generation of a APP:
Use the name and CLASS fingerprints to calculate the hash
Create a string (toHashString) with the value "app\n"
Concatenate the 'name' and a '\n'. If the APP does not have a name then use ". Order the CLASS Fingerprints
For each CLASS, concatenate a string representation of the CLASS Fingerprint and a '\n'. Take the 'toHashString' value and hash it.

Service:
An APP represents the definition of one or more APPs.
An example (in YAML, with comments) of the 'Mail-Server' SERVICE definition is shown at FIG. 4E.
Fingerprint generation of a SERVICE:
Use the name and APP fingerprints to calculate the hash
Create a string (toHashString) with the value "service\n"
Concatenate the 'name' and a '\n'. If the SERVICE does not have a name then use ". Order the APP Fingerprints
For each APP, concatenate a string representation of the APP Fingerprint and a '\n'.
Take the 'toHashString' value and hash it.

Package:
A PACKAGE represents the definition of one or more SERVICEs.
An example (in YAML, with comments) of the 'Mail-ServerPackage' PACKAGE definition is shown at FIG. 4F.
Fingerprint generation of a PACKAGE:
Use the name and SERVICE fingerprints to calculate the hash
Create a string (toHashString) with the value "package\n"
Concatenate the 'name' and a '\n'. If the PACKAGE does not have a name then use ". Order the SERVICE Fingerprints
For each SERVICE, concatenate a string representation of the SERVICE Fingerprint and a '\n'.
Take the 'toHashString' value and hash it.

Enum:
An ENUM represents enumerated values.
Example 1 (in YAML, with comments) of the 'CardSuit' ENUM definition is shown at FIG. 4G.
Example 2 (in YAML, with comments) of the 'Day-OfWeek' ENUM definition is shown at FIG. 4H.
Fingerprint generation of an ENUM:
Use the ENUM name and the sorted enum-item names (and optionally enum item values) to calculate the hash. Eg. (IoTP)
Create a string (toHashString) with the value "enum\n"
Concatenate the enum 'name' and a '\n'. If the ENUM does not have a name then use ". Order the enum-item(s) by enum-item name and enum-item value.
For each enum-item, concatenate a string representation of the enum-item name, a '\n', the enum-item value and a '\n'.
Take the 'toHashString' value and hash it.

Struct:
A STRUCT represents enumerated values.
Example 1 (in YAML, with comments) of the 'Notification' STRUCT definition is shown at FIG. 4I.
Example 2 (in YAML, with comments) of the 'Address' STRUCT definition is shown at b.
Fingerprint generation of a STRUCT:
Use the STRUCT name and the sorted struct-item names & types to calculate the hash.
Create a string (toHashString) with the value "struct\n"
Concatenate the struct 'name' and a '\n'. If the STRUCT does not have a name then use ". Order the struct-items by name and type.
For each struct-item, concatenate a string representation of the type (or Fingerprint of ENUM/STRUCT) a '\n', the name, and a '\n'.
Take the 'toHashString' value and hash it.

Figure 5:
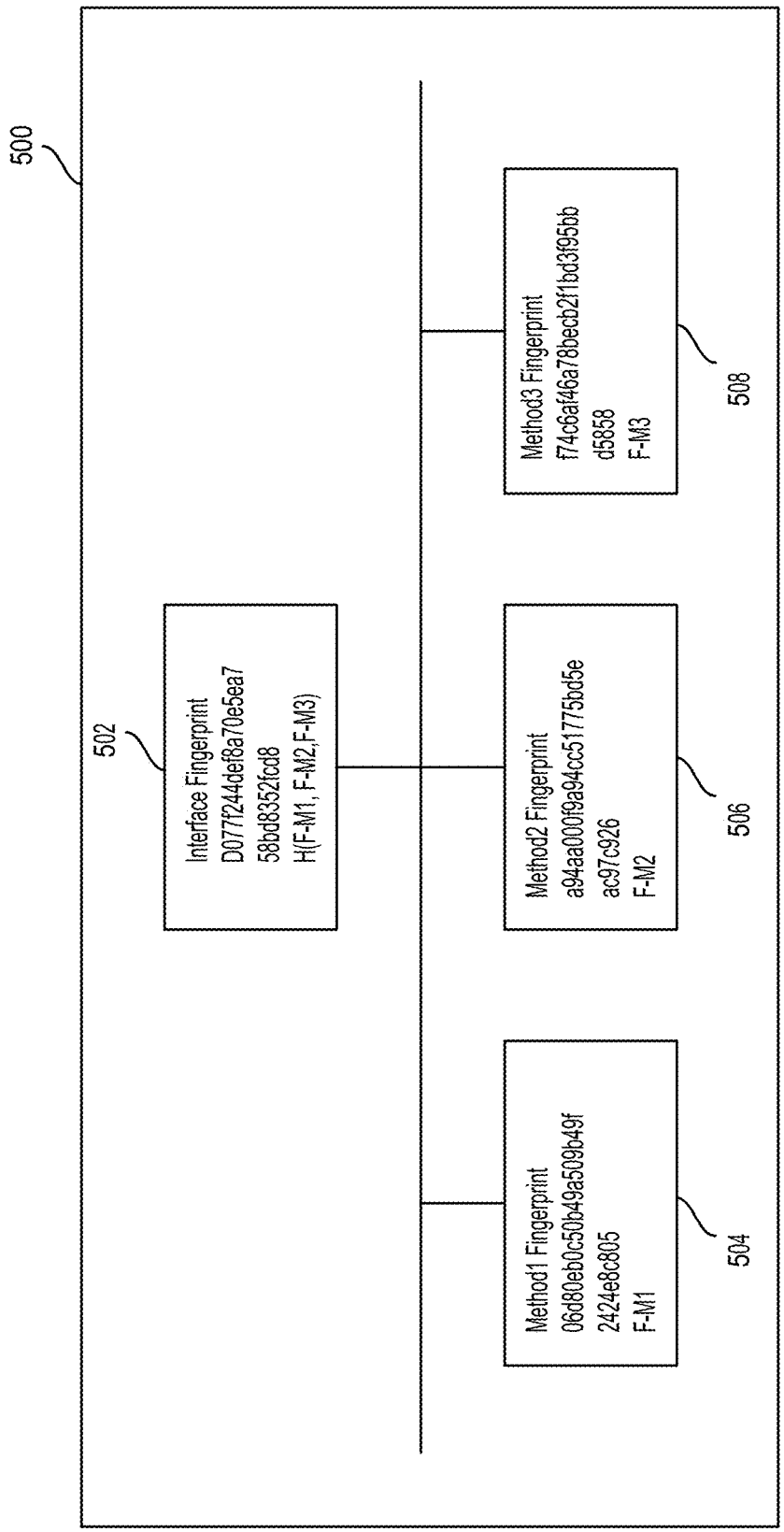
FIG. 5 is a simplified diagram showing cascaded hashing relationships across different layers of interconnected computational elements, according to some embodiments.

FIG. 5 is a simplified diagram showing cascaded hashing relationships across different layers of interconnected computational elements, according to some embodiments. In this example, a simplified interface 502 is shown having three underlying methods, method 1 504, method 2 506, and method 3 508.

The interrelationships established using cascaded hashing can be useful, for example, in reduced computations being required to be able to validate that a fingerprint belongs to the group of fingerprints directly above it (e.g., leaf/parent node validation in a Merkle tree). The interrelationships can be utilized for determining permissions that are associated with specific roles or userspaces or user accounts, as the inheritance/extension aspects of the interlinkages are maintained and can be traversed. For example, a particular role, such as sysadmin, may have permissions to utilize an entire class of functions, such as pwd, fdisk, rm, etc., while a user role may be limited to just a function such as pwd. The fingerprints for the commands, with flags for example, such as pwd −P or pwd −L can also inherit the same permissions, etc.

An example set of plurality of interface interaction layers can include, for example, at least two of: parameters, programmatic methods that include as arguments the parameters, programmatic interfaces that are comprised of the one or more programmatic methods, programmatic classes that are comprised of the one or more programmatic interfaces, programmatic applications that are comprised of the one or more programmatic classes, and programing services that are comprised of the one or more programmatic applications; and wherein the cascaded hashing incorporates the hashing relationships indicative of the relationships between related computational elements of the plurality of interface interaction layers. The hierarchy can be based on levels as between computational object oriented objects in the computer programming language, representing relationships such as inheritance, extending, among others.

Accordingly, in a variant embodiment, the fingerprints can be used not only for identifying the particular interaction type the message is adapted for, the cascaded relationship can be used to identify hierarchical relationships thereof between fingerprints, and multiple fingerprints can be utilized in the context of a particular message indicating broadly or narrowly the types of parameters being passed, classes to be utilized, methods, interface types, etc.

In this example, the generated fingerprint for interface 502 is based on the hashes for 504, 506, 508, which means that adherence to 502 means adherence to all of 504, 506, and 508. This can be computationally verified (e.g., by the target device) if a publicly known function is used (and if a salt is used, the salt can be shared).

The fingerprints can also be used for controlling discovery, authentication, and/or permissions to utilize specific computational elements, such as interfaces. The cascading can be used as a convenient computational mechanism for tracking hierarchy, such that validation of a higher or a lower cryptographic identifier can be conducted relative to positioning within the plurality of interface interaction layers. The hierarchy can be utilized for inheriting permissions or tracked handling capabilities either upwards or downwards in the hierarchy, or for quick validation of the relationship between fingerprints of different levels.

Accordingly, the approach can be used to reduce the amount of computations required for the validation process of either permissions or capabilities. While the reduction of computations required may be small, this reduction can be important when scaling the solution to handle a large number of concurrent messages (e.g., as part of an enterprise middleware messaging bus infrastructure).

Figure 6:
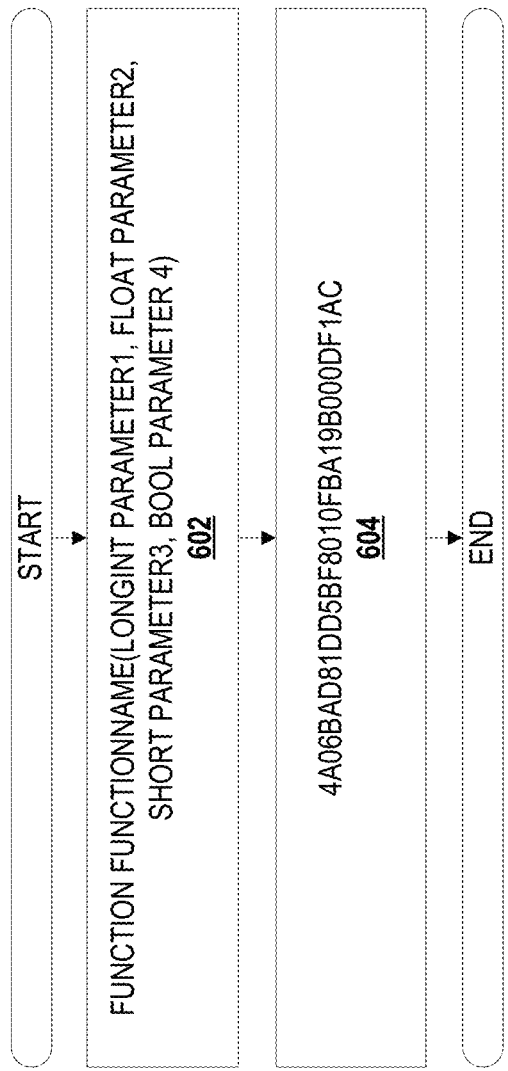
FIG. 6 is a method diagram showing an example approach for authoring a computational element and generating a corresponding cryptographic identifier, according to some embodiments.

FIG. 6 is a method diagram showing an example approach for authoring a computational element 602 and generating a corresponding cryptographic identifier 604, according to some embodiments.

For example, the fingerprints can be referenced with an access control data structure that stores data values indicating the originator/author of the computational element, the types of devices that are approved or disapproved utilize this computational element, and any expected remuneration that needs to be provided to the originator/author whenever the computational element is adopted or used.

For example, the processing of the new message can include (i) authenticating the new message by comparing the at least one cryptographic identifier of the new message using an access control list (ACL) against an identifier of an originator device of the new message to determine whether the originator device is permitted to use the computational element associated with the at least one cryptographic identifier; and (ii) transforming the new message to indicate authorization of the utilization of the computational element associated with the at least one cryptographic identifier, or (i) authenticating the new message by comparing the at least one cryptographic identifier of the new message using a list of known computational elements capable of being processed by the target device to identify the target computational element, and (ii) transforming the new message to indicate authorization of the utilization of the computational element associated with the at least one cryptographic identifier.

Where approved, for example, the new message may then be transformed to correspond with a new schema associated with the computational element associated with the at least one cryptographic identifier.

The transforming of the new message can include generating a new cryptographic signature for the transformed new message and appending the new cryptographic signature onto the transformed new message to indicate compatibility.

To add new computational elements and couple them to cryptographic identifiers (e.g., registering a new class of MailServer interfaces), in some embodiments, a new schema for a new computational element is received and a new cryptographic identifier can be appended to the set of cryptographic identifiers based on a cryptographic representation of the new schema.

In a variant embodiment, the system can also be utilized as a mechanism for interface adoption and re-use.

Figure 7:
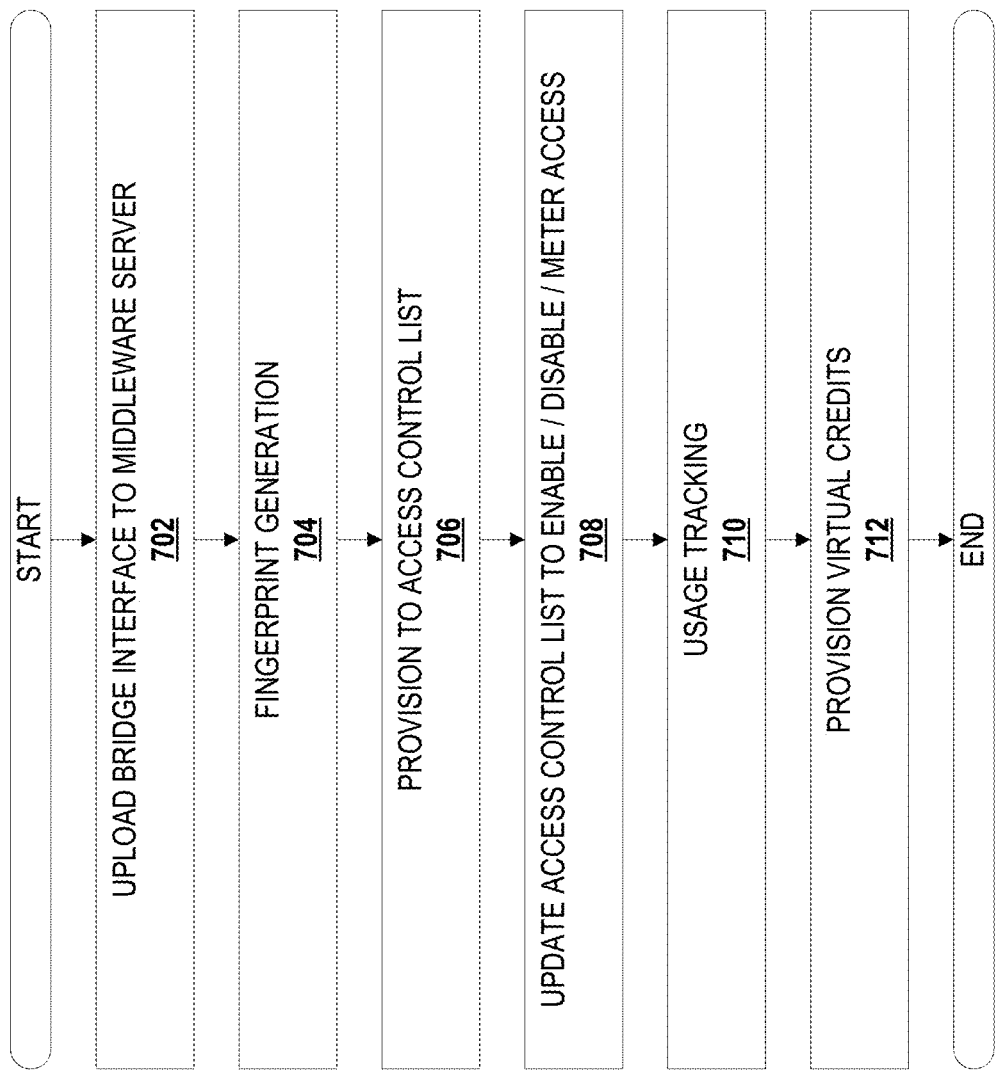
FIG. 7 is a method diagram showing an example approach for interface adoption, according to some embodiments.

FIG. 7 is a method diagram showing an example approach for interface adoption, according to some embodiments.

For example, if a third party has invested resources into developing a custom interface that is able to allow for intercommunications between two different services (e.g., a transformation that maps the various fields and/or code that implements changes to the messages for processing), the third party may choose to make such custom interface available for usage by other parties communicating over the system. The custom interface "bridge interface" is uploaded to the middleware server 702. The bridge interface can be, for example, a set of transformative code representing rules and/or other transformations (e.g., truncation of inputs, sanitization of inputs to avoid script injection). One or more fingerprints is generated at 704, for example, in some embodiments, a cascaded set of fingerprints can be generated for each element and their corresponding hierarchy. The fingerprint may be registered at an access control list 706.

The fingerprint may be exposed by the third party and provided to the communicating parties (or just one communicating party). Usage can be controlled by the access control list 706, which is updated from time to time to enable, disable, or meter access 708. When the fingerprint is used by either party at 710 (either to indicate how a message should be sent or how a message needs to be received), the system 100 can identify that a transformation is required to convert the message from a first type to a second type, and implement the transformation accordingly. In this example, the sending or the receiving party would not have to undertake the expense and the cost to write their own custom interface.

A marketplace can be provided for custom interfaces, according to some embodiments, where automatic counting of uses and/or remuneration processes can be utilized (e.g., a custom interface app store using cryptographic fingerprints). The marketplace need not have financial remuneration, in some embodiments, the access controller can be configured to simply track custom interface usage at 710 such that the originating parties are able to track how often the custom interface has been utilized, or provide remuneration in kind or in service improvements at 712, such as providing higher execution priority or queue-jumping status to specifically designated data packets (e.g., those associated with the originator of the custom interface).

Figure 8:
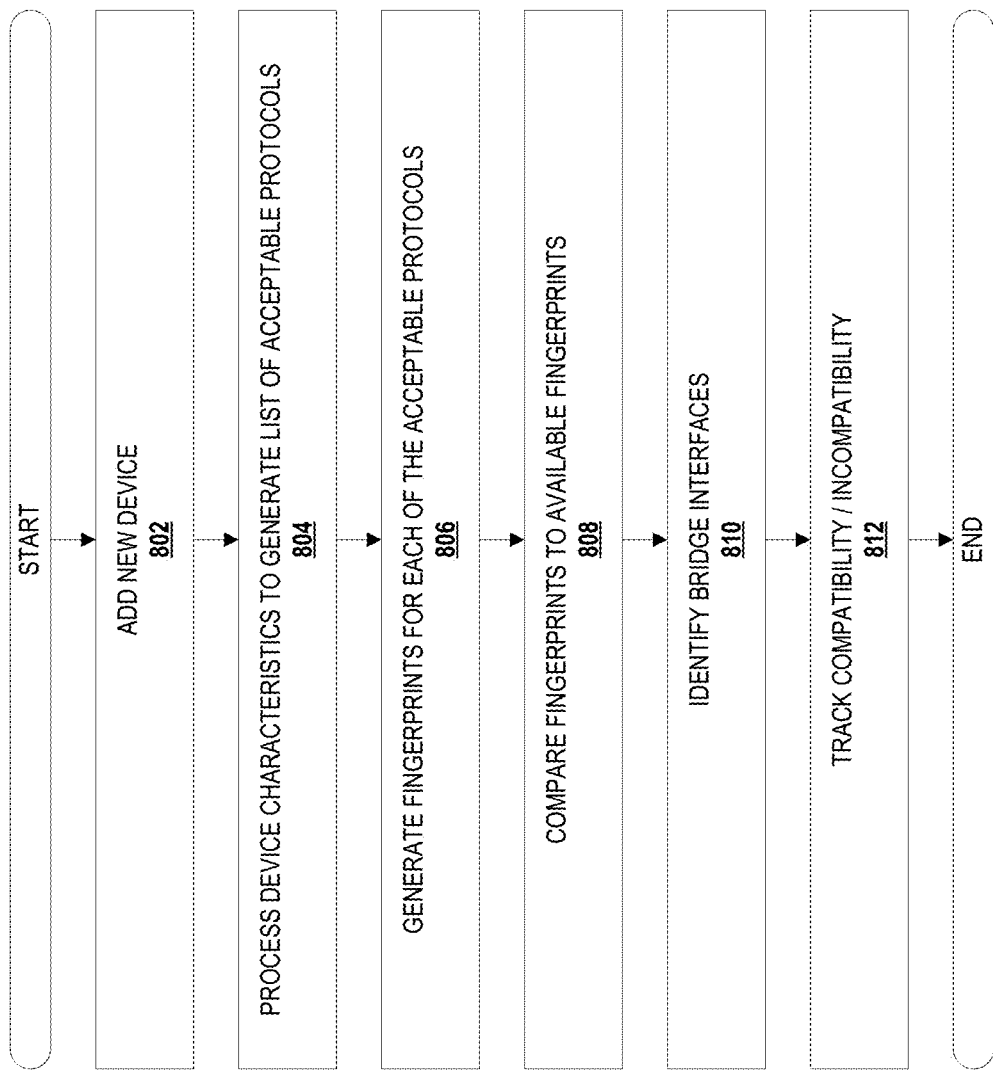
FIG. 8 is a method diagram showing an example approach for interface discovery, according to some embodiments.

FIG. 8 is a method diagram showing an example approach for interface discovery, according to some embodiments.

In another variant embodiment, the system can be used for interface discovery. When a new device is registered for communications across the system at 802, the new device may undertake a discovery process at 804 where either a program may be run to identify all compatible services that are in use and generate corresponding fingerprints at 806 if any are new, or the device simply provides a list of fingerprints indicating how and which messages are to be transmitted, received, or processed by the device. The system may log these fingerprints on the system so that another device looking to communicate with the new device is able to identify whether communications will be compatible or incompatible at 808. If incompatible, in accordance with an embodiment, if a custom interface is made by a third party, as noted above, the fingerprint of the custom interface can be used to conduct a corresponding transformation to allow for interoperability without re-developing a custom interface at 810.

Compatibility/incompatibility can be tracked at 812 the system 100, for example, exposing a list of orphaned schemas/protocols that a custom interface developer may wish to develop for.

Figure 9:
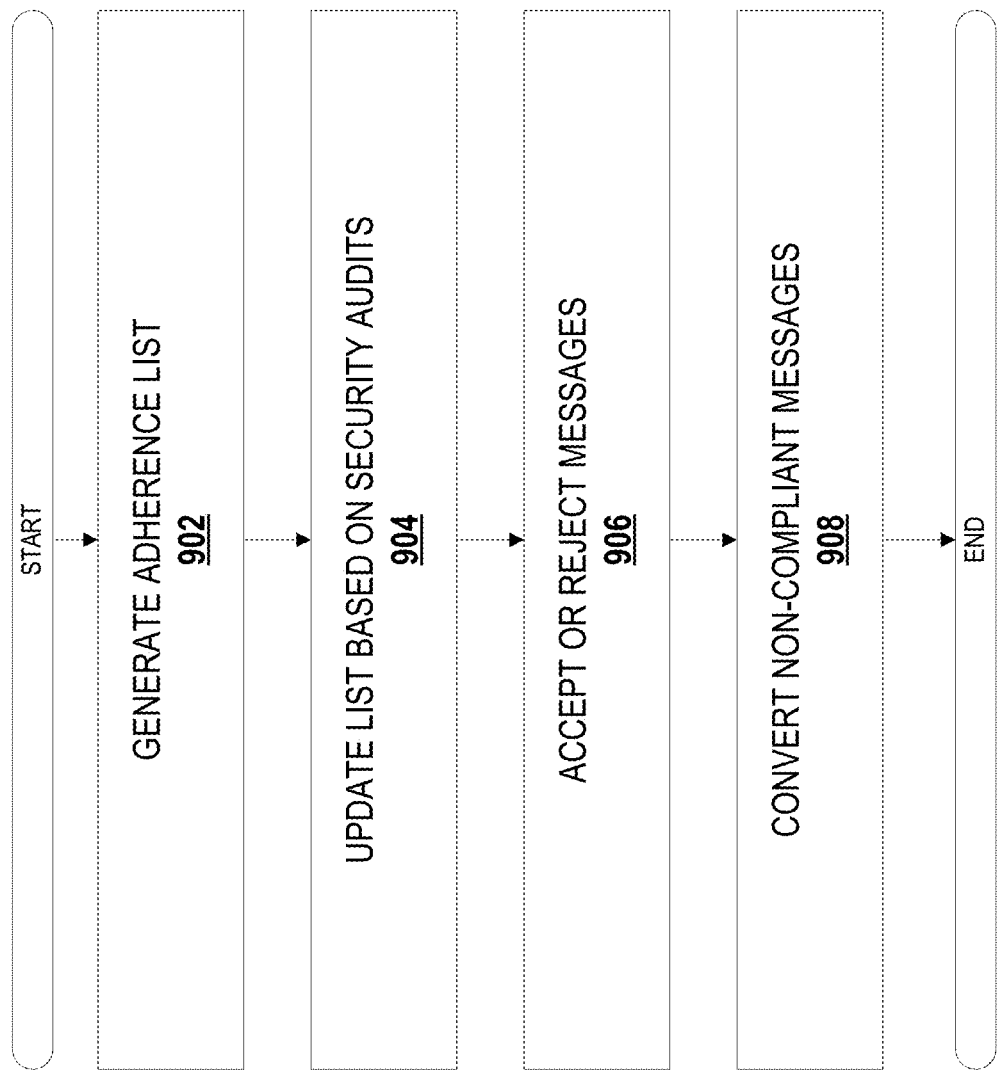
FIG. 9 is a method diagram showing an example approach for standards adherence, according to some embodiments.

FIG. 9 is a method diagram showing an example approach for standards adherence, according to some embodiments.

In another variant embodiment, the system may be configured to require specific adherence to at least a minimum set of fingerprints before allowing device communications across the system at 902. This, for example, can be used to require adherence to minimum cybersecurity requirements (e.g., only certified interfaces can be used that are known to include SQL injection avoidance mechanisms), or to require adherence to a specific technology stack or communication standard (e.g., a hospital network requiring that all communications for hospitals within the network be set up based on their specific interpretation of HL-7 to encourage data integrity such that a patient seen at one hospital can have consistent data if then seen at another hospital).

For example, security audit outputs or digital signatures thereof can be used to indicate that certain fingerprints and their associated computational elements have passed security audits at 904, which can then be used either at the system 100 to accept accept or reject messages as they are received at a middleware level, or used to accept or reject messages as they are received at the receiver device at 906.

In some embodiments, adherence to a particular standard may cause the system 100 to automatically cause the conversion at 908 of one computational element to another (e.g., require a transformation that causes a shift in parameters/payload to require, for example, script injection protection by limiting all symbols from Unicode to ASCII. In this example, the middleware system 100 acts as an security watchdog process to enhance security of the overall system by enforcing adherence.

Figure 10:
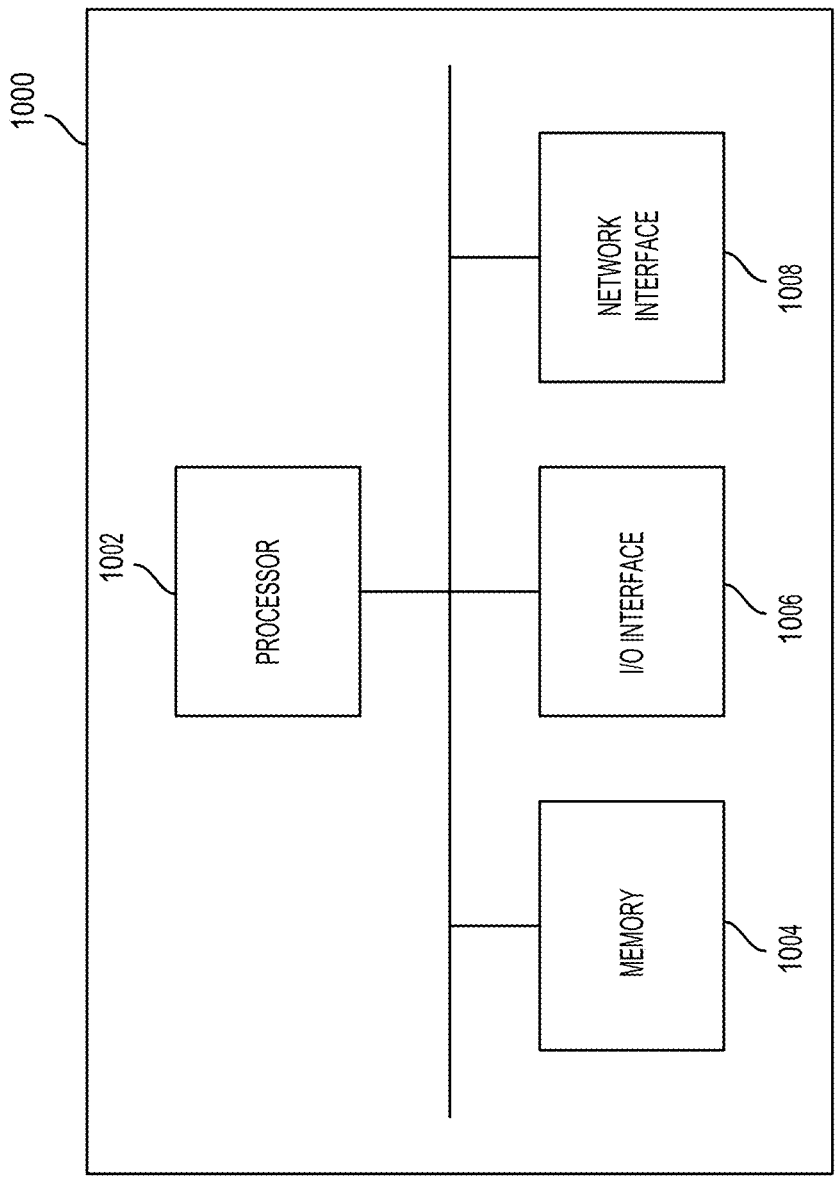
FIG. 10 is an example computing system, according to some embodiments.

FIG. 10 is an example computing server that can be used to implement the system 100. The server 1000 can have one or more computer processors, which can include physical microprocessors, field programmable gate arrays, etc., reduced instruction set processors. The computer processors operate in conjunction with computer memory 1004, such as read only memory, random access memory, and messages can be transmitted across input/output interfaces 1006 and network interface 1008. The server 1000, for example, can reside in one computer, multiple computers, or a distributed set of computing resources (e.g., cloud computing). In a scaled implementation, there may be disaster recovery and backup systems to provide a redundant implementation and a robust middleware that is resilient to lost computing capacity.

FIG. 11 is an example Specification and Description Language (SDL) snippet showing a series of definitions that each have fingerprints, according to some embodiments.

In snippet 1100, the fingerprints are not declared above (although they can be, as long as they are correct), but are always calculated on caller and target machines to ensure that invoked calls will not be routed incorrectly, both over the network and within a machine (device).

In operation, A caller (aka a remote from the perspective of the target) routes to and requests a call to a target. This call includes service, app, class, interface, and method fingerprints, or it includes one fingerprint equal to the hash of the 5 aforementioned fingerprints. The call may also include an optional package fingerprint. The caller is attempting to connect to the target using its connection credentials. The target receives the caller credentials and looks up the caller in the target's data store.

A number of aspects must be true to allow the caller to invoke the target's requested package, service, app, class, interface, and method:

1. The caller must be enabled.
2. The package, service, and app must all be present and enabled (all are referenced by their fingerprint).
3. The publisher of the package must be enabled. For the example above, the publisher is stepsoftware.com.
4. The caller must have an allowed role (per the SDL) to invoke the method of the package, service, app, class, and interface.
5. The caller role(s) are calculated on the target machine by:

Enumerate the permissions for any PACKAGE/SERVICE/APP (PSA) ACL combinations in the target's data store that match the invoked method call.

For each PSA, enumerate the connections listed, such as a Connection (represents a remote user or machine), a Domain Group (represents anyone within a specific domain, such as @stepsoftware.com), a Select Group (ad hoc list of Connections, Domain Groups, or other Select Groups), and Everyone (yes, everyone).

For each connection, determine if it matches the remote (caller), via a direct match (Connection), a Domain Group match (same domain), a Select Group match (the remote is listed in the Select Group or in a nested Select Group), or Everyone.

For each match, append the associated role(s) (free form identifier, can be text, numerical, or other) to the list of roles that the caller has.

6. The allowed role(s) are calculated on the target machine by:

Iterating through the chain of the call as defined in the SDL, from the package to the method.

In the case of IFileSystem::pwd( ), start at the root FSService service, where permission is provided to the roles admin, user & look.

The are no ACL specifications for the app FSApp, nor for the class FSClass, so the allowed roles remain as admin, user & look.

The IFileSystem interface only supports the roles admin & user.

The method string pwd( ) only supports the role user.

7. If all steps proceeding this one are successful, and at least one of the calculated role(s) of the caller (see 6) are in the list of roles that the caller has (see 5.D), then the method can be invoked. If not, then the call is rejected.

FIGS. 12A, 12B, 12C, 12D, 12E, 12F, 12G, 12H are example screenshots of an example administrator interface, according to some embodiments. In this example scenario, the selected package, service, app, and publisher are all enabled, as are the caller connection ids of craig@example.com and rob@example.com.

Figure 12A:
FIG. 12A, 12B, 12C, 12D, 12E, 12F, 12G, 12H are example screenshots of an example administrator interface, according to some embodiments.
Figure 12B:
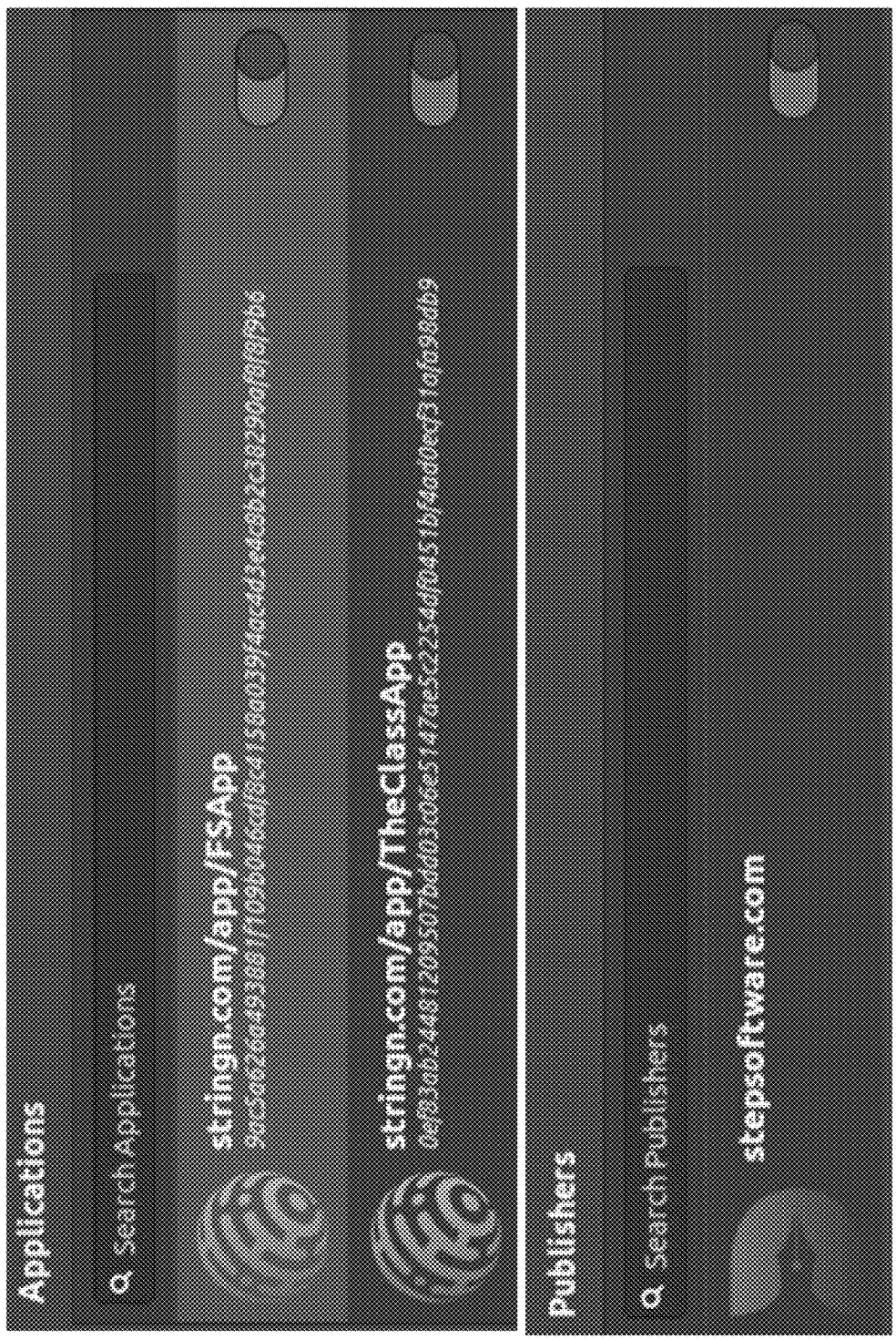
Figure 12C:
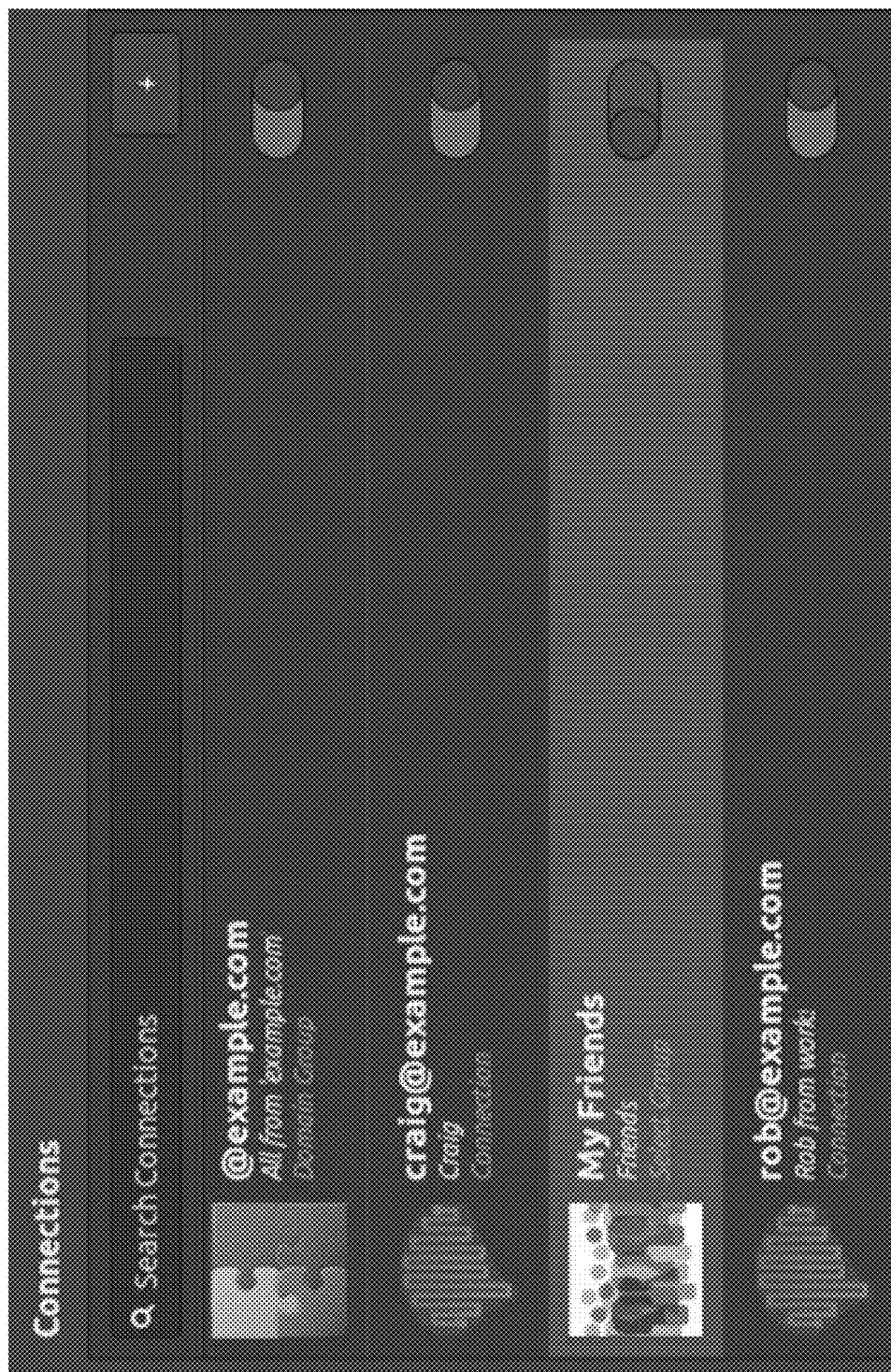
Figure 12D:
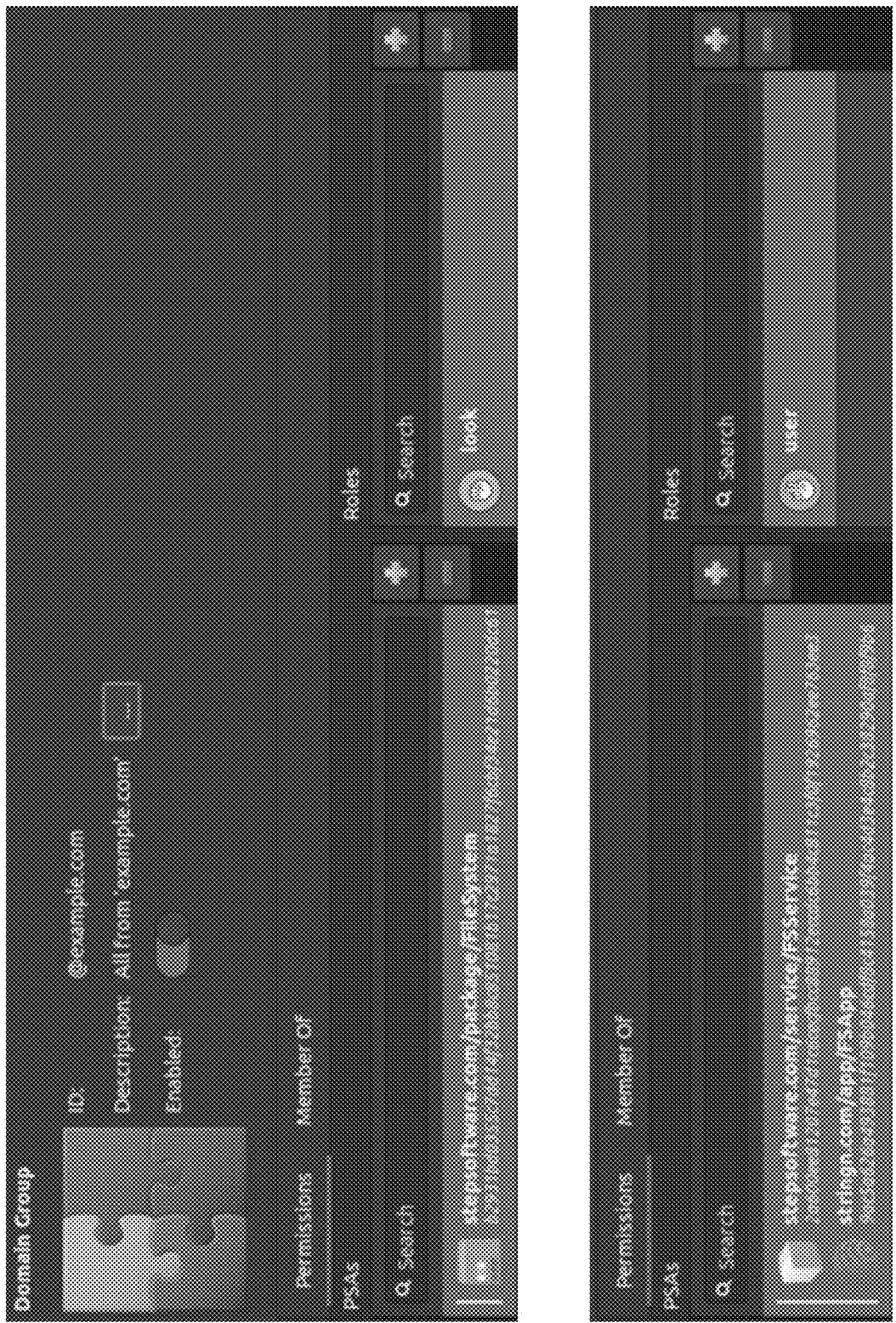
Figure 12E:
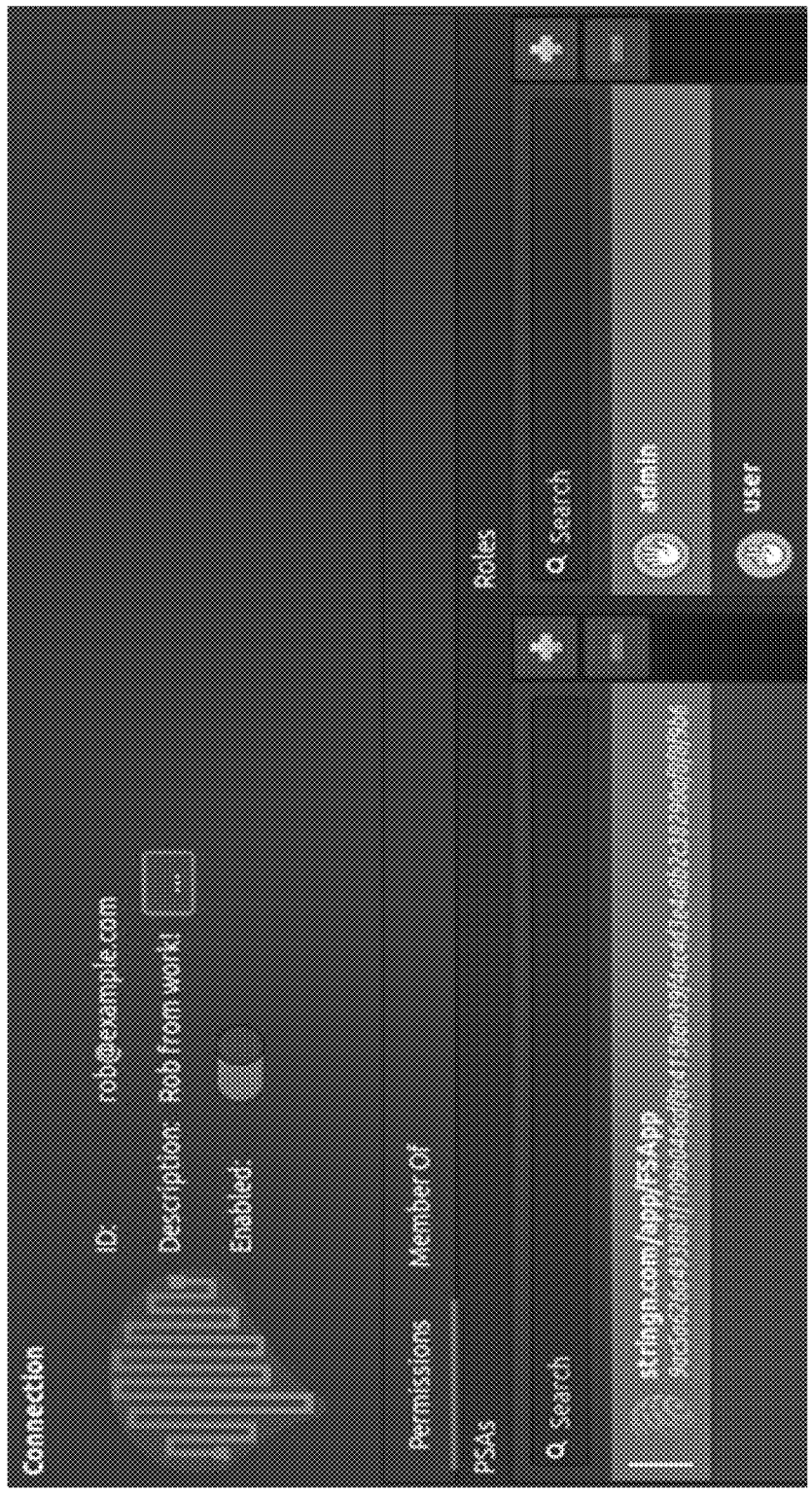
Figure 12F:
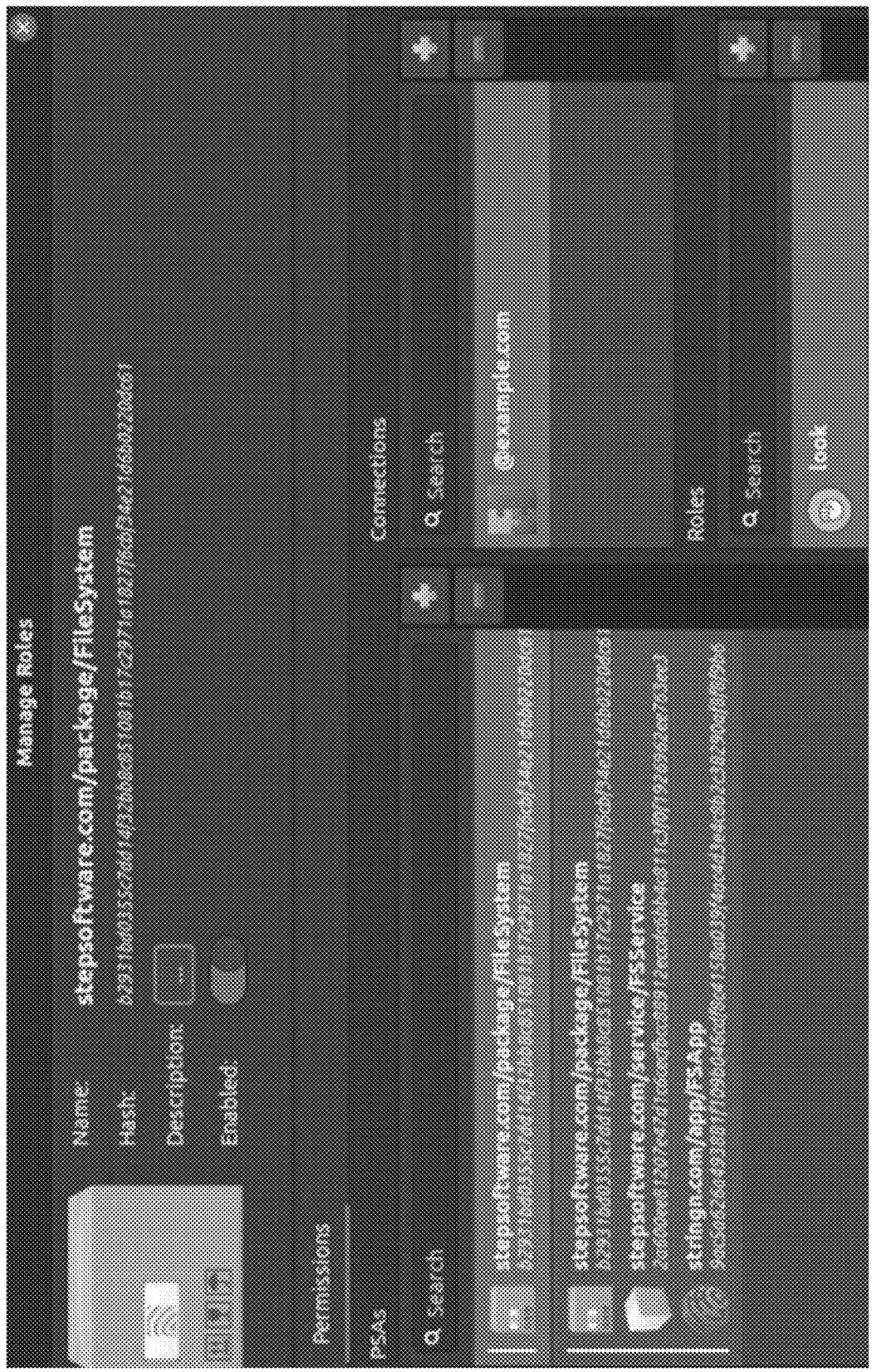
Figure 12G:
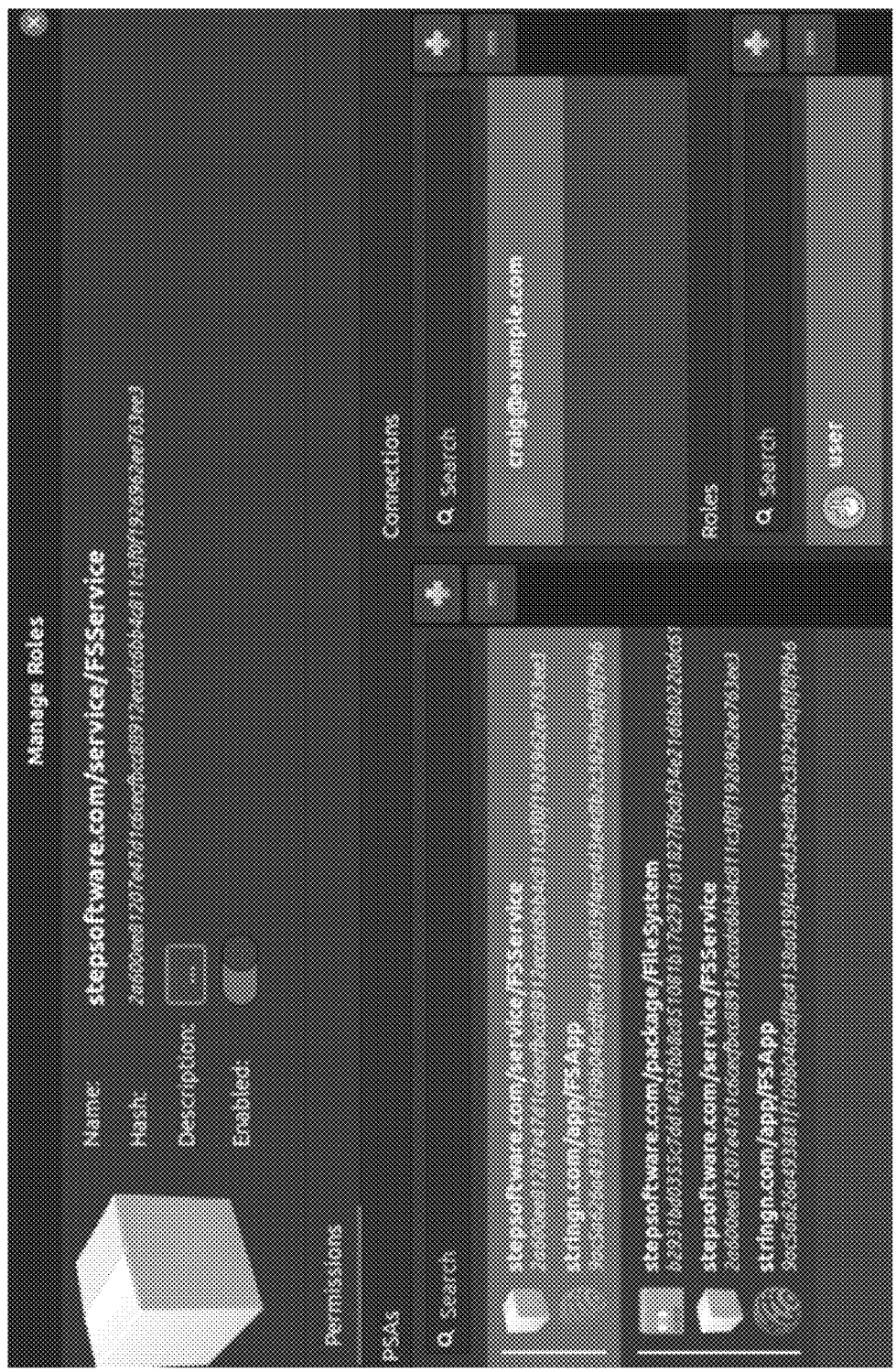
Figure 12H:
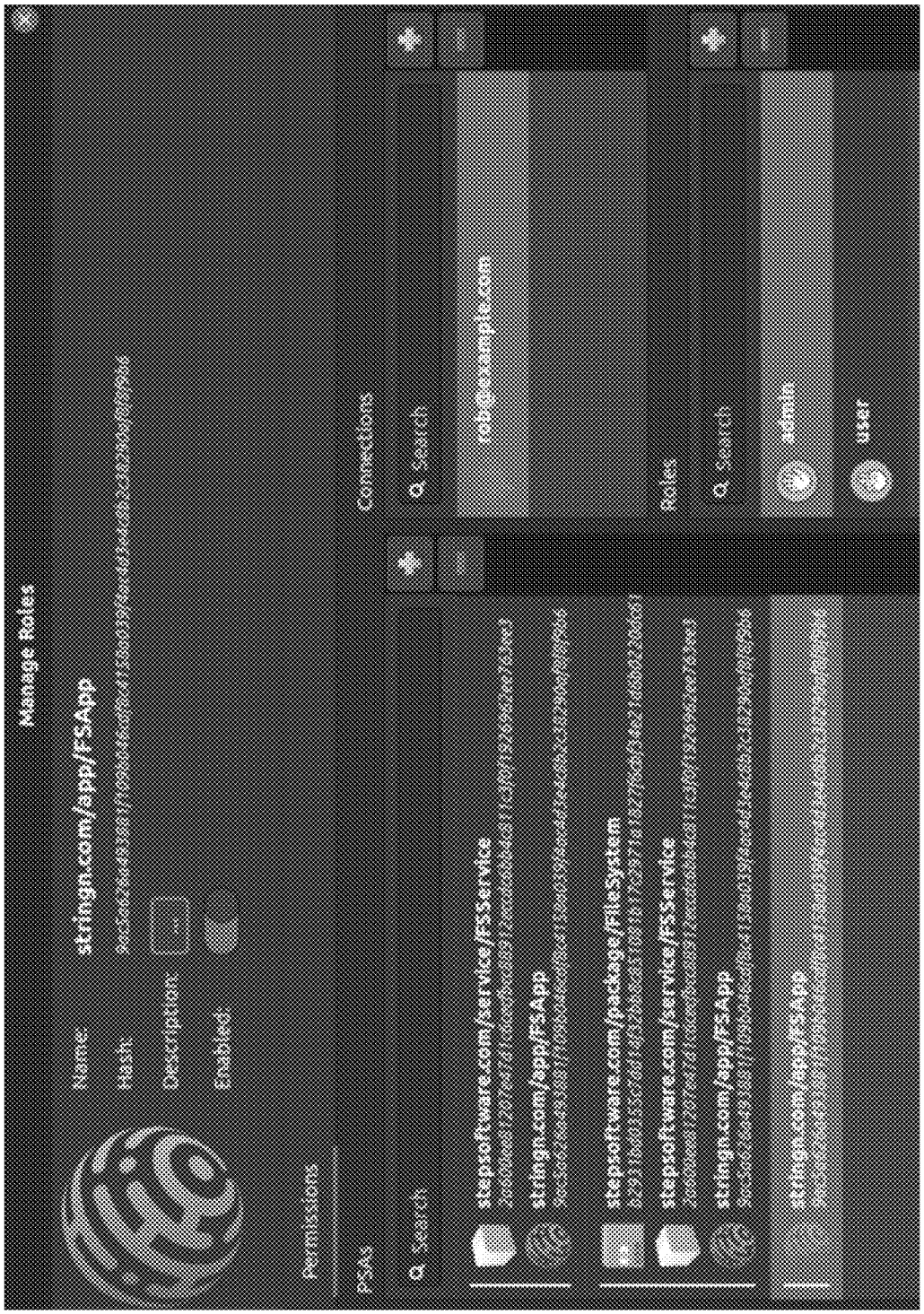

In FIG. 12A, the package FileSystem is shown to be enabled, along with the service FSService. In FIG. 12B, the app FSApp is enabled. The two apps are shown with their fingerprints noted below their titles, and the slider interface element can be used to quickly enable or disable the handling capabilities of the middleware system. The publisher stepsoftware.com is shown to be enabled. In FIG. 12C, the connections rob@example.com, craig@example.com and the domain group @example.com are shown to be enabled. In FIG. 12D, the role look has been assigned to the psa FileSystem for all members of the domain @example.com, and the role user has been assigned to the PSA FSService+ FSApp for craig@example.com. In FIG. 12E, the roles admin and user have been assigned to the PSA FSApp for rob@example.com. In FIG. 12F, an alternate view of permissions, from the perspective of the package FileSystem is shown. In FIG. 12G, an alternate view of permissions, from the perspective of the service FSService is shown. In FIG. 12H, an alternate view of permissions, from the perspective of the app FSApp is shown. In FIG. 12I, a view of the manage group permissions screens is shown. In this example, the feature select group my friends is disabled, so it is not used to determine permissions.

FIG. 13A, FIG. 13B, FIG. 13C, and FIG. 13D are drawings that illustrate a number of scenarios are provided below in respect of roles and permissions that can be automatically handled by the system through the usage of the fingerprints and access control lists, according to some embodiments.

There can be different roles that are possible, such as standard operating system roles such as user roles, superuser roles, administrator roles, and customized roles can be possible or purpose-built roles, such as roles for automatic data processes (e.g., a memory allocation garbage cleaning process, a policy daemon), and the system can be configured to efficiently track and manage permissions for data messaging and/or computational element calling/invocation.

FIGS. 13A-13D show a remote FileSystem example of how different roles interact in respect of an access control list.

Figure 13A:
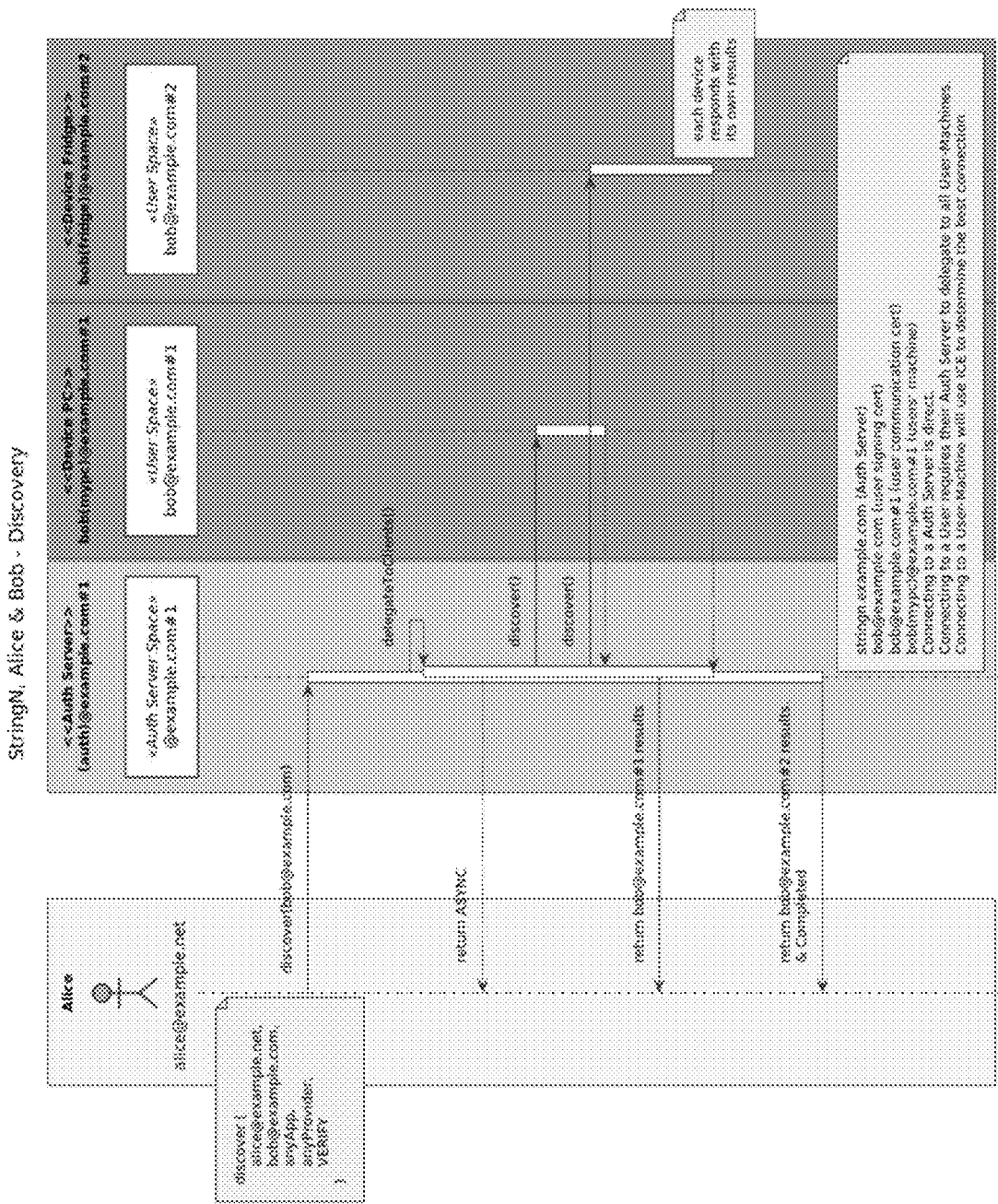
FIG. 13A, FIG. 13B, FIG. 13C, and FIG. 13D are drawings that illustrate a number of scenarios are provided below in respect of roles and permissions that can be automatically handled by the system through the usage of the fingerprints and access control lists, according to some embodiments.

FIG. 13A shows an example discovery process where Alice is looking to obtain results in respect of bob@example.com. In this example, bob has two devices, a personal computer, and a fridge.

An example server configuration is provided below:

```
# File-Name: alice@example.net.snconfig
# NOTE: Validate contents using alice@example.net signature file alice@example.net.snconfig.snsig
?
owner:
   identity: alice@example.net #target identity
publishers:
   example.com:
      enabled: true
      name: "Example Co"
      description: "A Test Organization"
connections:
   "@":
      enabled: true
      description: Everyone
   "@gmail.com":
      enabled: true
      description: GMail Users
   "@example.com":
      enabled: true
      description: Example.com Group
   root@example.com:
      enabled: true
      description: All Power
   alice@example.net:
      enabled: true
      description: Alice Wonderland
   bob@example.com:
      enabled: true
      description: Bob Dutch
groups:
   MyNewGroup:
      enabled: true
      description: Test Group 123
      connections:
         - bob@example.com
         - my friends
   my friends:
      enabled: true
      description: My Friends
      connections:
         - alice@example.net
         - bob@example.com
         - root@example.com
approved:
   -
   example.com/package/TheTestPackage/a9c9d2193d1b8b9ef559c3450c2252c9d570cad8c9037bdaa4d437ef94076404
   -
   example.com/package/FileSystem/b2931bd0355c7dd14f32bb8c851081b17c2971a1827f6cbf34e21d6b0220dc61
```

-continued

```
-
example.com/service/FSService/2a600ee81207e47d1c6cecfbcc88912eccdc6bb4c811c3f0f1926962ee76
3ee3
-
example.com/service/TheClassAppService/4cdf4c2dcbdf38dbeab15ce34783652088dbf44f5a09e1de892
33e2b6e735743
-
stringn.com/app/TheClassApp/
0ef83ab24481209507bdd03c06e5147ae5c2254df0451 bf4ad0ecf31afa98db9
  - stringn.com/app/FSApp/9ac5a626a493881f109b046cdf8c4158a039f4ac4d3e4c8b2c38290af8f8f9b6
psas:
  - package:
example.com/package/FileSystem/b2931bd0355c7dd14f32bb8c851081b17c2971a1827f6cbf34e21d6b0
220dc61
      description: ""
      connections:
        "@example.com":
          - user
        alice@example.net:
          - admin
        root@example.com:
          - admin
  - package:
example.com/package/TheTestPackage/a9c9d2193d1b8b9ef559c3450c2252c9d570cad8c9037bdaa4d4
37ef94076404
      description: """
      connections:
        "@example.com":
          - user
        alice@example.net:
          - admin
FSService.SNDL
```

This is a file service definition. 30

```
- roles: [ admin, user ]
- acl: [ deny: "*", allow: [ admin, user ] ] #this applies to the service below
- ?comment: Test File Access
-
example.com/service/FSService/2a600ee81207e47d1c6cecfbcc88912eccdc6bb4c811c3f0f1926962ee76
3ee3:
    - stringn.com/app/FSApp/
9ac5a626a493881f109b046cdf8c4158a039f4ac4d3e4c8b2c38290af8f8f9b6:
        -
stringn.com/class/FSClass/451 bf4ad0ecf31afa98db90ef83ab24481209507bdd03c06e5147ae5c2254df0:
            -
stringn.com/interface/IFileSystem/ae5c2254df0451bf4ad0ecf31afa98db90ef83ab24481209507bdd03c06
e5147:
                - acl: [ deny: "*", allow: [ admin ] ] #this applies to the method 'rm'
                - bool rm(string filename)
#09b046cdf8c4158a039f4ac4d3e4c8b2c38290af8f8f9b69ac5a626a493881f1
                    - string pwd( ) #f8f9b69ac5a626a493881f109b046cdf8c4158a039f4ac4d3e4c8b2c38290af8
                    - any ls(bool showHidden)
#39f4ac4d3e4c8b2c38290af8f8f9b69ac5a626a493881f109b046cdf8c4158a0
                    - bool mkdir(string name)
#b2c38290af8f8f9b69ac5a626a493881f109b046cdf8c4158a039f4ac4d3e4c8
                    - bool cp(string from, string to)
#8c4158a039f4ac4d3e4c8b2c38290af8f8f9b69ac5a626a493881f109b046cdf
                    - bool mv(string from, string to)
#a493881f109b046cdf8c4158a039f4ac4d3e4c8b2c38290af8f8f9b69ac5a626
                    - bool touch(string name)
#93881f109b046cdf8c4158a039f4ac4d3e4c8b2c38290af8f8f9b69ac5a626a4
                    - acl: [ deny: "*", allow: [ admin ] ] #this applies to the method 'rmdir'
                    - rmdir(string path, bool force)
#cdf8c4158a039f4ac4d3e4c8b2c38290af8f8f9b69ac5a626a493881f109b046
                    - acl: [ deny: "*", allow: [ admin ] ] #this applies to the method 'cd'
                    - bool cd(string path)
#4ac4d3e4c8b2c38290af8f8f9b69ac5a626a493881f109b046cdf8c4158a039f
# define the package !!
-
example.com/package/FileSystem/b2931bd0355c7dd14f32bb8c851081b17c2971a1827f6cbf34e21d6b0
220dc61:
    -
example.com/service/FSService/2a600ee81207e47d1c6cecfbcc88912eccdc6bb4c811c3f0f1926962ee76
3ee3:
```

Calling a Remote FileSystem

The FSService.SNDL file provides a definition for calling a remote file system. The collection of callable methods are defined by the stringn.com/interface/IFileSystem interface. The interface is implemented within a class that extends stringn.com/class/FSClass. The class stringn.com/class/FSClass is contained in the app stringn.com/app/FSApp, and the app stringn.com/app/FSApp in contained within the service example.com/service/FSService.

To call the remote methods, one needs to access a package that implements the example.com/service/FSService service. As defined at the bottom of FSService.SNDL, the package the system will be calling is example.com/package/FileSystem.

Fingerprint Overview

Using the IFileSystem::pwd( ) method as an example, the system needs to request it by passing in the applicable fingerprints:

package fingerprint b2931bd0355c7dd14f32bb8c851081b17c2971a1827f6cbf34e21d6b0220dc61 (example.com/package/FileSystem)

service fingerprint 2a600ee81207e47d1c6cecfbcc88912eccdc6bb4c811c3f0f1926962ee763ee3 (example.com/service/FSService)

app fingerprint 9ac5a626a493881f109b046cdf8c4158a039f4ac4d3e4c8b2c38290af8f8f9b6 (stringn.com/app/FSApp)

class fingerprint 451bf4ad0ecf31afa98db90ef83ab24481209507bdd03c06e5147ae5c2254df0 (stringn.com/class/FSClass)

interface fingerprint ae5c2254df0451bf4ad0ecf31afa98db90ef83ab24481209507bdd03c06e5147 (stringn.com/interface/IFileSystem)

method fingerprint f8f9b69ac5a626a493881f109b046cdf8c4158a039f4ac4d3e4c8b2c38290af8 (string pwd( ))

OR

Alternatively, the system can call the IFileSystem::pwd( ) method with the package fingerprint and a super-fingerprint, which is a hash of the service+app+class+interface+method:

package fingerprint b2931bd0355c7dd14f32bb8c851081b17c2971a1827f6cbf34e21d6b0220dc61 (example.com/package/FileSystem)

super-fingerprint 039f4ac4d3e4c8b2c38290af8f8f9b69ac5a626a493881f109b046cdf8c4158a (FSService::FSApp::FSClass::IFileSystem::string pwd( ))

use the super-fingerprint to lookup the:

service fingerprint 2a600ee81207e47d1c6cecfbcc88912eccdc6bb4c811c3f0f1926962ee763ee3 (example.com/service/FSService)

app fingerprint 9ac5a626a493881f109b046cdf8c4158a039f4ac4d3e4c8b2c38290af8f8f9b6 (stringn.com/app/FSApp)

class fingerprint 451bf4ad0ecf31afa98db90ef83ab24481209507bdd03c06e5147ae5c2254df0 (stringn.com/class/FSClass)

interface fingerprint ae5c2254df0451bf4ad0ecf31afa98db90ef83ab24481209507bdd03c06e5147 (stringn.com/interface/IFileSystem)

method fingerprint f8f9b69ac5a626a493881f109b046cdf8c4158a039f4ac4d3e4c8b2c38290af8 (string pwd( ))

In addition, the system can pass an array of variants to hold the in parameters (in-params) to the method, and an empty variant for returned values (out-params).

Figure 13B:
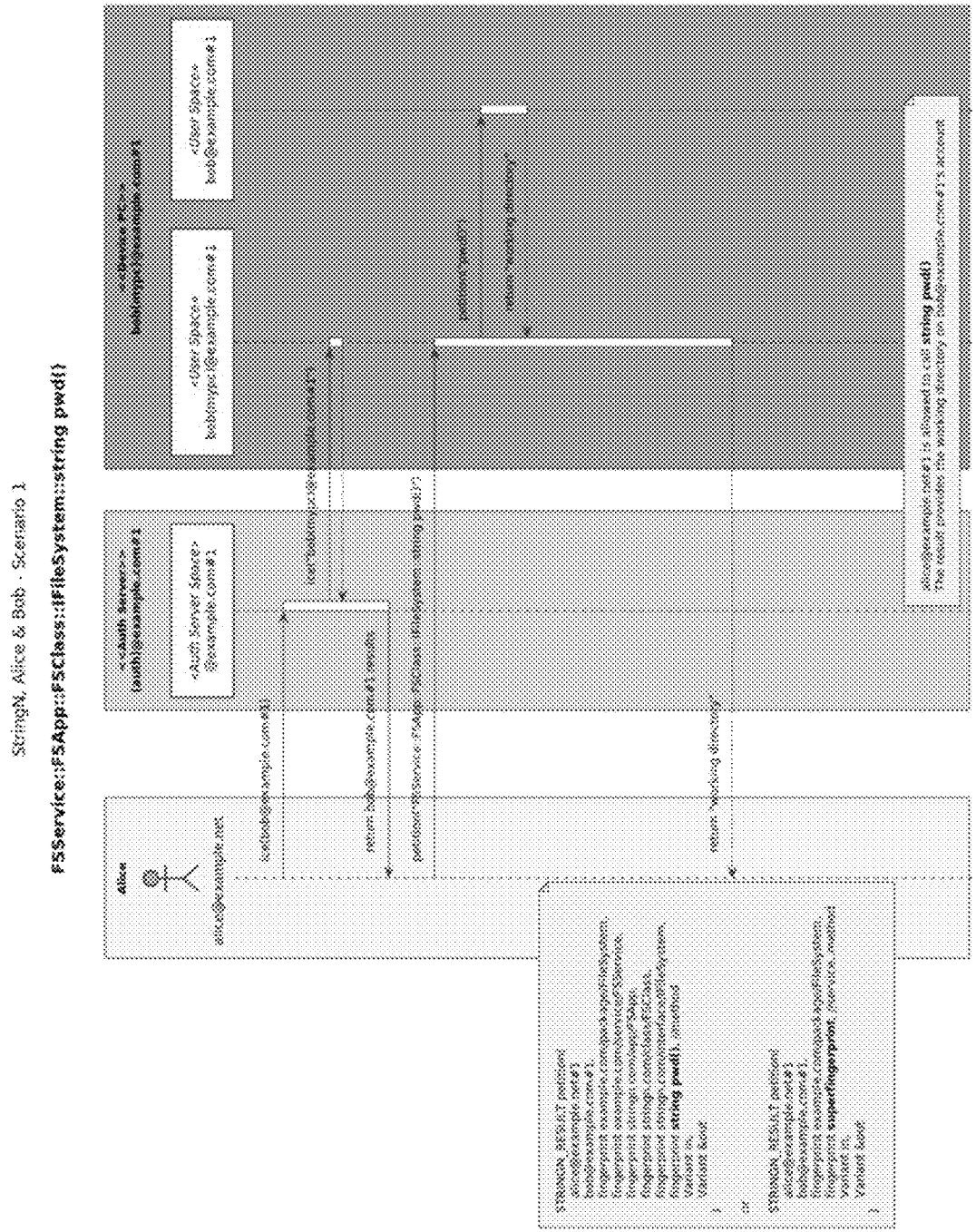

FIG. 13B illustrates Scenario 1: Print Working Directory (bob@example.com).

bob@example.com calls to the target alice@example.net with the following fingerprints:

package fingerprint b2931bd0355c7dd14f32bb8c851081b17c2971a1827f6cbf34e21d6b0220dc61 (example.com/package/FileSystem)

super-fingerprint 039f4ac4d3e4c8b2c38290af8f8f9b69ac5a626a493881f109b046cdf8c4158a (FSService::FSApp::FSClass::IFileSystem::string pwd( ))

in-params is empty (because string pwd( ) does not have any parameters).

out-params is empty (and will be populated with the string result of the method pwd( )).

Once the remaining fingerprints are looked up using the super-fingerprint reference, there is:

package fingerprint b2931bd0355c7dd14f32bb8c851081b17c2971a1827f6cbf34e21d6b0220dc61 (example.com/package/FileSystem)

service fingerprint 2a600ee81207e47d1c6cecfbcc88912eccdc6bb4c811c3f0f1926962ee763ee3 (example.com/service/FSService)

app fingerprint 9ac5a626a493881f109b046cdf8c4158a039f4ac4d3e4c8b2c38290af8f8f9b6 (stringn.com/app/FSApp)

class fingerprint 451bf4ad0ecf31afa98db90ef83ab24481209507bdd03c06e5147ae5c2254df0 (stringn.com/class/FSClass)

interface fingerprint ae5c2254df0451bf4ad0ecf31afa98db90ef83ab24481209507bdd03c06e5147 (stringn.com/interface/IFileSystem)

method fingerprint f8f9b69ac5a626a493881f109b046cdf8c4158a039f4ac4d3e4c8b2c38290af8 (string pwd( ))

The target (alice@example.net) uses the alice@example.net.snconfig file and the FSService.SNDL definition to determine if permission to the requested resource (string pwd( )) is permitted.

SNDL

First, the target, alice@example.net, reviews the FSService.SNDL file to determine permission required to access the method string pwd( ).

example.com/package/FileSystem/b2931bd0355c7dd14f32bb8c851081b17c2971a1827f6cbf34e21d6b0220dc61:
  - acl: [ deny: "*", allow: [ admin, user ] ]

example.com/service/FSService/2a600ee81207e47d1c6cecfbcc88912eccdc6bb4c811c3f0f1926962ee763ee3:
  - stringn.com/app/FSApp/9ac5a626a493881f109b046cdf8c4158a039f4ac4d3e4c8b2c38290af8f8f9b6:
  -

-continued

```
stringn.com/class/FSClass/451bf4ad0ecf31afa98db90ef83ab24481209507bdd03c06e5147ae5c2254df0:
-
stringn.com/interface/IFileSystem/ae5c2254df0451bf4ad0ecf31afa98db90ef83ab24481209507bdd03c06
e5147:
- string pwd( ) #f8f9b69ac5a626a493881f109b046cdf8c4158a039f4ac4d3e4c8b2c38290af8
```

Starting from the root:
1. package fingerprint b2931bd0355c7dd14f32bb 8c851081b17c2971a1827f6cbf34e21d6b0220dc61 (example.com/package/FileSystem) is without any acls.
2. service fingerprint 2a600ee81207e47d1c6cecfbcc 88912eccdc6bb4c811c3f0f1926962ee763ee3 (example.com/service/FSService) has an acl allowing permission to a caller with either the permission admin or user. This will apply to all children unless a new acl changes permission.
3. app fingerprint 9ac5a626a493881f109b046cd f8c4158a039f4ac4d3e4c8b2c38290af8f8f9b6 (stringn.com/app/FSApp) is without any acls, so role access remains either admin or user.
4. class fingerprint 451bf4ad0ecf31afa98db90ef83a b24481209507bdd03c06e5147ae5c2254df0 (stringn.com/class/FSClass) is without any ads, so role access remains either admin or user.
5. interface fingerprint ae5c2254df0451bf4ad0ecf31afa9 8db90ef83ab24481209507bdd03c06e5147 (stringn.com/interface/IFileSystem) is without any acls, so role access remains either admin or user.
6. method fingerprint f8f9b69ac5a626a493881f109b046 cdf8c4158a039f4ac4d3e4c8b2c38290af8 (string pwd( )) is without any acls, so role access remains either admin or user.

Therefore, only a caller with a role of admin or user will be allowed to call the method string pwd( ).
SNCONFIG Second, the target, alice@example.net, reviews the alice@example.net.snconfig file to determine permission granted to the caller bob@example.com.
 1. Confirm the target SNCONFIG matches the target of the method call. owner:
  identity: alice@example.net #target identity is correct
 2. Confirm the package publisher (example.com/package/FileSystem) is enabled. publishers:
  example.com:
   enabled: true #yes, the example.com publisher is enabled.
 3. Confirm the requested package, service, and app fingerprints are all enabled. approved:
  example.com/package/FileSystem/
   b2931bd0355c7dd14f
   32bb8c851081b17c2971a1827f6cbf34e21d6b0
   220dc61 #package enabled
  example.com/service/FSService/
   2a600ee81207e47d1c6cecfbcc88912eccdc6bb4c81
   1c3f0f1926962ee76 3ee3 #service enabled
  stringn.com/app/FSApp/
   9ac5a626a493881f109b046cdf8c4158a039f4ac4d3
   e4c8b2c38290af8f8f9b6 #app enabled
 4. Review all matching psas. Determine if the caller matches the connections within each psa. If it matches, append the map of connection and list of roles, i.e. {"@example.com", {"user"}} psas:

package: example.com/package/FileSystem/ b2931bd0355c7dd14f32bb8c851081b17c2971a182 7f6cbf34e21d6b0 220dc61
  connections:
   "@example.com": #this matched bob@example.com
   user
 5. Review the map of connection and list of roles (i.e. {"@example.com", {"user"}}), and ensure the connection is enabled.
 connections:
  "@example.com":
   enabled: true #yes, the @example.com domain connection is enabled.
 6. Since @example.com is enabled the system appends the to the list of valid roles the user role from the map,
Therefore, the caller bob@example.com has one role, user, and the requested method (string pwd( )) requires a role of admin or user.

The call to string pwd( ) is allowed.

Figure 13C:
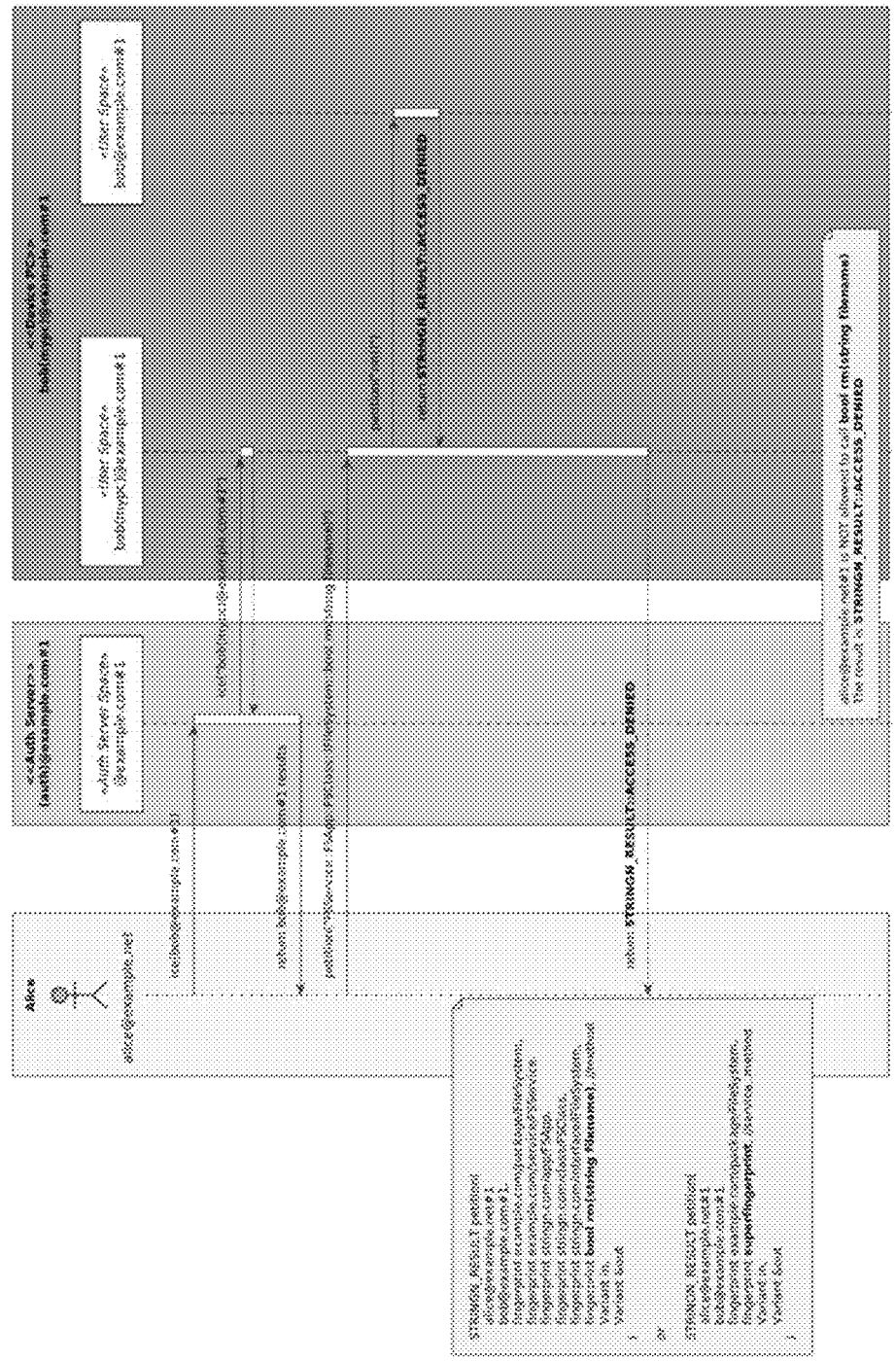

FIG. 13C illustrates scenario 2: Remove File (bob@example.com).

bob@example.com calls to the target alice@example.net with the following fingerprints:
 package fingerprint b2931bd0355c7dd14f32bb8c85108 1b17c2971a1827f6cbf34e21d6b0220dc61 (example.com/package/FileSystem)
 service fingerprint 2a600ee81207e47d1c6cecfbcc88912 eccdc6bb4c811c3f0f1926962ee763ee3 (example.com/service/FSService)
 app fingerprint 9ac5a626a493881f109b046cdf8c4158a 039f4ac4d3e4c8b2c38290af8f8f9b6 (stringn.com/app/FSApp)
 class fingerprint 451bf4ad0ecf31afa98db90ef83ab244 81209507bdd03c06e5147ae5c2254df0 (stringn.com/class/FSClass)
 interface fingerprint ae5c2254df0451bf4ad0ecf31afa 98db90ef83ab24481209507bdd03c06e5147 (stringn.com/interface/IFileSystem)
 method fingerprint 09b046cdf8c4158a039f4ac4d3e4c8b 2c38290af8f8f9b69ac5a626a493881f1 (bool rm(string filename))

The target (alice@example.net) uses the alice@example.net.snconfig file and the FSService.SNDL definition to determine if permission to the requested resource (bool rm(string filename)) is permitted.
SNDL First, the target, alice@example.net, reviews the FSService.SNDL file to determine permission required to access the method bool rm(string filename).

```
example.com/package/FileSystem/b2931 bd0355c7dd14f32bb8c851081b17c2971a1827f6cbf34e21d6b0
220dc61:
    - acl: [ deny: "*", allow: [ admin, user ] ]

example.com/service/FSService/2a600ee81207e47d1c6cecfbcc88912eccdc6bb4c811c3f0f1926962ee76
3ee3:
    -
stringn.com/app/FSApp/9ac5a626a493881f109b046cdf8c4158a039f4ac4d3e4c8b2c38290af8f8f9b6:
    -
stringn.com/class/FSClass/451bf4ad0ecf31afa98db90ef83ab24481209507bdd03c06e5147ae5c2254df0:
    -
stringn.com/interface/IFileSystem/ae5c2254df0451bf4ad0ecf31afa98db90ef83ab24481209507bdd03c06
e5147:
          - acl: [ deny: "*", allow: [ admin ] ]
          - bool rm(string)
09b046cdf8c4158a039f4ac4d3e4c8b2c38290af8f8f9b69ac5a626a493881f1
```

Starting from the Root:
1. package fingerprint b2931bd0355c7dd14f32bb8c851081 b17c2971a1827f6cbf34e21d6b0220dc61 (example.com/package/FileSystem) is without any acls.
2. service fingerprint 2a600ee81207e47d1c6cecfbcc88912eccd c6bb4c811c3f0f1926962ee763ee3 (example.com/service/FSService) has an acl allowing permission to a caller with either the permission admin or user. This will apply to all children unless a new acl changes permission.
3. app fingerprint 9ac5a626a493881f109b046cdf 8c4158a039f4ac4d3e4c8b2c38290af8f8f9b6 (stringn.com/app/FSApp) is without any acls, so role access remains either admin or user.
4. class fingerprint 451bf4ad0ecf31afa98db90ef83ab2448 1209507bdd03c06e5147ae5c2254df0 (stringn.com/class/FSClass) is without any ads, so role access remains either admin or user.
5. interface fingerprint ae5c2254df0451bf4ad0 ecf31afa98db90ef83ab24481209507bdd03c06e5147 (stringn.com/interface/IFileSystem) is without any acls, so role access remains either admin or user.
6. method fingerprint 09b046cdf8c4158a039 f4ac4d3e4c8b2c38290af8f8f9b69ac5a626a493881f1 (bool rm(string filename)) has an acl allowing permission to a caller with the permission of admin only.

Therefore, only a caller with a role of admin will be allowed to call the method bool rm(string filename).
SNCONFIG Second, the target, alice@example.net, reviews the alice@example.net.snconfig file to determine permission granted to the caller bob@example.com.

NOTE: This remains the same as the Scenario 1 example above.

1. Confirm the target SNCONFIG matches the target of the method call. owner:

identity: alice@example.net #target identity is correct
2. Confirm the package publisher (example.com/package/ FileSystem) is enabled. publishers:
   example.com:
      enabled: true #yes, the example.com publisher is enabled.
3. Confirm the requested package, service, and app fingerprints are all enabled. approved:

```
    -
example.com/package/FileSystem/b2931bd0355c7dd14f32bb8c851081b17c2971a1827f6cbf34e21d6b0
220dc61 #package enabled
    -
example.com/service/FSService/2a600ee81207e47d1c6cecfbcc88912eccdc6bb4c811c3f0f1926962ee76
3ee3 #service enabled
    -
stringn.com/app/FSApp/9ac5a626a493881f109b046cdf8c4158a039f4ac4d3e4c8b2c38290af8f8f9b6
    #app enabled
```

4. Review all matching psas. Determine if the caller matches the connections within each psa. If it matches, append the map of connection and list of roles, i.e. {"@example.com", {"user"}} psas:
   package:
   example.com/package/FileSystem/ b2931bd0355c7dd14f32bb8c851081b17c2971a1827f 6cbf34e21d6b0 220dc61
      connections:
         "@example.com":      #this      matched
            bob@example.com
            user
5. Review the map of connection and list of roles (i.e. {"@example.com", {"user"}}), and ensure the connection is enabled. connections:
   "@example.com":
      enabled: true #yes, the @example.com domain connection is enabled.
6. Since @example.com is enabled the system appends the to the list of valid roles the user role from the map, Therefore, the caller bob@example.com has one role, user, and the requested method (bool rm(string filename)) requires a role of admin.

The call to rm( ) is NOT allowed.

Figure 13D:
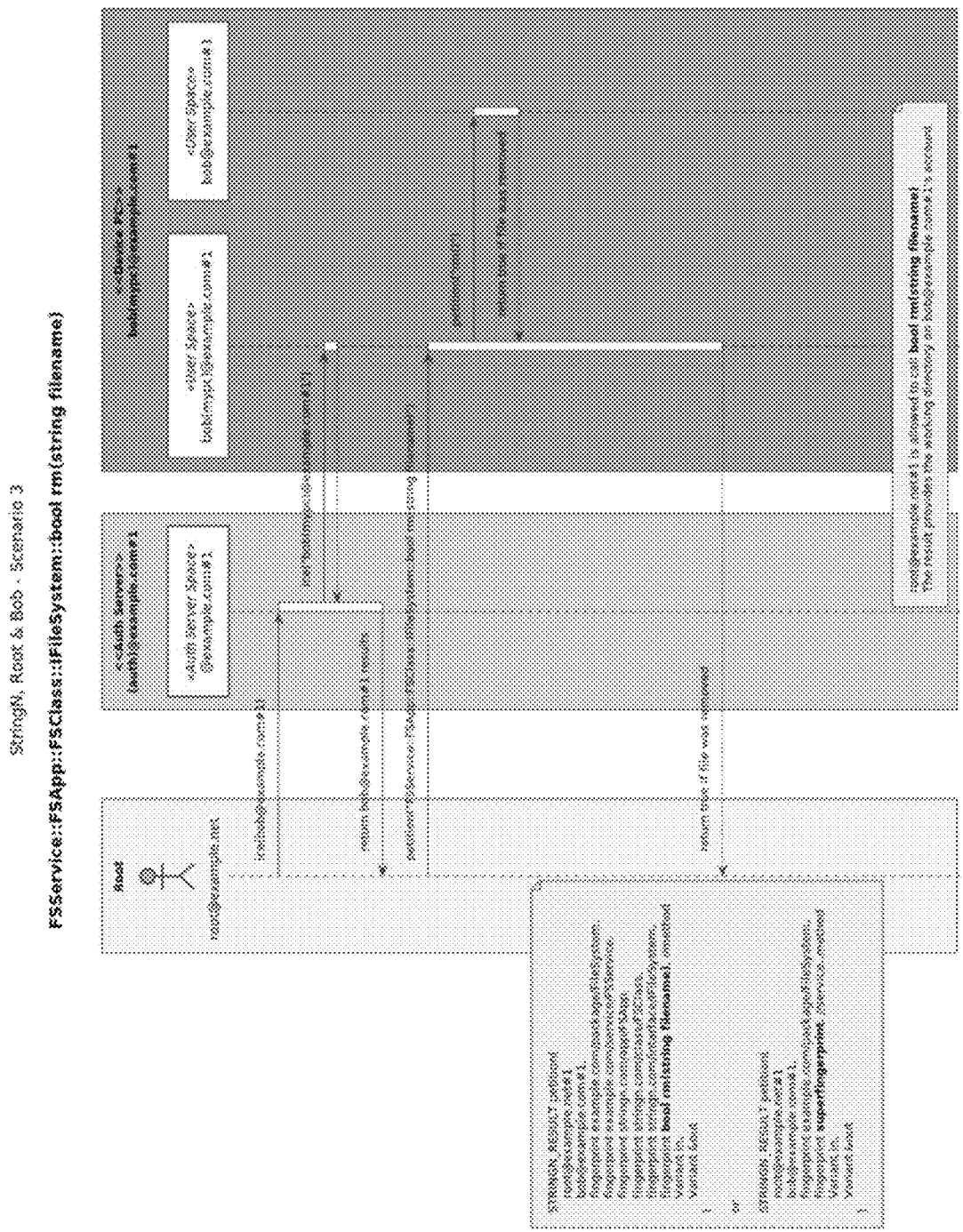

FIG. 13D illustrates scenario 3: Remove File (root@example.com).

root@example.com calls to the target alice@example.net with the following fingerprints:
   package                                                fingerprint
   b2931bd0355c7dd14f32bb8c851081b17 c2971a1827f6cbf34e21d6b0220dc61 (example.com/ package/FileSystem)

service fingerprint 2a600ee81207e47d1c6cecfbcc88912 eccdc6bb4c811c3f0f1926962ee763ee3 (example.com/service/FSService)

app fingerprint 9ac5a626a493881f109b046cdf8c4158a 039f4ac4d3e4c8b2c38290af8f8f9b6 (stringn.com/app/FSApp)

class fingerprint 451bf4ad0ecf31afa98db90ef83ab24481 209507bdd03c06e5147ae5c2254df0 (stringn.com/class/FSClass)

interface fingerprint ae5c2254df0451bf4ad0ecf31afa98db90 ef83ab24481209507bdd03c06e5147 (stringn.com/interface/IFileSystem)

method fingerprint 09b046cdf8c4158a039f4ac4d3e4c8b2c38 290af8f8f9b69ac5a626a493881f1 (bool rm(string filename))

The target (alice@example.net) uses the alice@example.net.snconfig file and the FSService.SNDL definition to determine if permission to the requested resource (bool rm(string filename)) is permitted.

SNDL

First, the target, alice@example.net, reviews the FSService.SNDL file to determine permission required to access the method bool rm(string filename).

NOTE: Since the requested method in Scenario 2 and 3 are the same (bool rm(string filename), the results are the same as the Scenario 2 example above.

(stringn.com/interface/IFileSystem) is without any acls, so role access remains either admin or user.

6. method fingerprint 09b046cdf8c4158a039f4ac4d3 e4c8b2c38290af8f8f9b69ac5a626a493881f1 (bool rm(string filename)) has an acl allowing permission to a caller with the permission of admin only.

Therefore, only a caller with a role of admin will be allowed to call the method bool rm(string filename).

SNCONFIG

Second, the target, alice@example.net, reviews the alice@example.net.snconfig file to determine permission granted to the caller root@example.com.

NOTE: Since the caller has changed, the results are different then Scenario 1 and 2 examples above.

1. Confirm the target SNCONFIG matches the target of the method call. owner:
   identity: alice@example.net #target identity is correct
2. Confirm the package publisher (example.com/package/FileSystem) is enabled.
   publishers:
     example.com:
       enabled: true #yes, the example.com publisher is enabled.
3. Confirm the requested package, service, and app fingerprints are all enabled. approved:
   example.com/package/FileSystem/b2931bd0355c7 dd14f32bb8c851081b17c2971a1827f6cbf34e21d6b 0 220dc61 #package enabled

--- example.com/package/FileSystem/b2931bd0355c7dd14f32bb8c851081b17c2971a1827f6cbf34e21d6b0 220dc61:
  - acl: [ deny: "*", allow: [ admin, user ] ]

example.com/service/FSService/2a600ee81207e47d1c6cecfbcc88912eccdc6bb4c811c3f0f1926962ee76 3ee3:
  -
stringn.com/app/FSApp/9ac5a626a493881f109b046cdf8c4158a039f4ac4d3e4c8b2c38290af8f8f9b6:
  -
stringn.com/class/FSClass/451bf4ad0ecf31afa98db90ef83ab24481209507bdd03c06e5147ae5c2254df0:
  -
stringn.com/interface/IFileSystem/ae5c2254df0451bf4ad0ecf31afa98db90ef83ab24481209507bdd03c06 e5147:
      - acl: [ deny: "*", allow: [ admin ] ]
- bool rm(string)
09b046cdf8c4158a039f4ac4d3e4c8b2c38290af8f8f9b69ac5a626a493881f1

---

Starting from the Root:
1. package fingerprint b2931bd0355c7dd 14f32bb8c851081b17 c2971a1827f6cbf34e21d6b0220dc61 (example.com/package/FileSystem) is without any acls.
2. service fingerprint 2a600ee81207e47d1c6c ecfbcc88912eccdc 6bb4c811c3f0f1926962ee763ee3 (example.com/service/FSService) has an acl allowing permission to a caller with either the permission admin or user. This will apply to all children unless a new acl changes permission.
3. app fingerprint 9ac5a626a493881f109b0 46cdf8c4158a039f 4ac4d3e4c8b2c38290af8f8f9b6 (stringn.com/app/FSApp) is without any acls, so role access remains either admin or user.
4. class fingerprint 451bf4ad0ecf31afa98db90ef83a b24481209 507bdd03c06e5147ae5c2254df0 (stringn.com/class/FSClass) is without any ads, so role access remains either admin or user.
5. interface fingerprint ae5c2254df0451bf4ad0 ecf31afa98db90ef83 ab24481209507bdd03c06e5147 example.com/service/FSService/2a600ee81207e47 d1c6cecfbcc88912eccdc6bb4c811c3f0f19 26962ee76 3ee3 #service enabled stringn.com/app/FSApp/9ac5a626a493881f10 9b046cdf8c4158a039f4ac4d3e4c8b2c38290a f8f8f9b6 #app enabled 4. Review all matching psas. Determine if the caller matches the connections within each psa. If it matches, append the map of connection and list of roles, i.e. {"@example.com", {"user"},"root@example.com", {"admin"}} psas:
   package: example.com/package/FileSystem/ b2931bd0355c7dd14f32bb8c851081b17c2971a182 7f6cbf34e21d6b0 220dc61
   connections:
     "@example.com":
       user
     root@example.com:
       admin 5. Review the map of connection and list of roles (i.e. {"@example.com", {"user"}, "root@example.com", {"admin"}}), and ensure the connection is enabled.

connections:
   "@example.com":
      enabled: true #yes, the @example.com domain connection is enabled.
   root@example.com:
      enabled: true #yes, the root@example.com domain connection is enabled.

6. Since @example.com is enabled, the system appends to the list of valid roles the user role from the map, and since root@example.com is enabled, the system appends to the list of valid roles the admin role from the map.

Therefore, the caller root@example.com has two roles, admin, and user. The requested method (bool rm(string filename)) requires a role of admin.

The call to rm( ) is allowed.

As described herein, the approach is a technical, computational solution that can be implemented in the form of a physical data messaging middleware device or other networking device configured for controlling routing of communications of data packets. The device can include one or more processors operating in conjunction with computer memory, and the one or more processors may be coupled to data storage. Corresponding methods, and non-transitory computer readable media (e.g., diskette, solid state storage, hard disk drive) storing machine-interpretable instructions thereon (e.g., software which when executed by a computer processor, cause the processor to perform a method described herein in various embodiments).

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

As can be understood, the examples described above and illustrated are intended to be exemplary only.

What is claimed is:

1. A computer implemented system for coordinating data messaging, the system comprising:
   a processor coupled to computer memory, the processor configured to:
      generate a set of cryptographic identifiers representing one or more interaction characteristics of a computational element associated with a hardware device or a software handler;
      receive, from a source device, a new message for routing to a target device or a logical target associated with the target device for processing, the new message including at least one cryptographic identifier of the set of cryptographic identifiers;
      process the new message based on the computational element corresponding to the at least one cryptographic identifier of the new message; and
      route the processed new message to the target device;
   wherein the processing of the new message comprises:
   (i) authenticating the new message by comparing the at least one cryptographic identifier of the new message using an access control list (ACL) against an identifier of an originator device of the new message to determine whether the originator device is permitted to use the computational element associated with the at least one cryptographic identifier; and
   (ii) transforming the new message to indicate authorization of the utilization of the computational element associated with the at least one cryptographic identifier;
   wherein the access control list (ACL) is stored on non-transitory computer readable media and includes a data structure storing a plurality of user accounts mapped to a plurality of role identifier labels, each role identifier label of the plurality of role identifier labels coupled with a permissions list defining a set of available computational elements that the role identifier label is permitted to interact with;
   wherein the plurality of role identifier labels include at least two of a user label, an administrator label, and a superuser label, and each identifier label of the plurality of role identifier labels includes different associated cryptographic identifiers indicative of different available computational elements that the role identifier label is permitted to interact with.

2. The system of claim 1, wherein the set of cryptographic identifiers are generated using cascaded hashing across a plurality of interface interaction layers such that the cascaded hashing provides a hierarchy of hashing interrelationships that can be utilized for validation that a lower cryptographic identifier belongs within a higher cryptographic identifier relative to positioning within the plurality of interface interaction layers.

3. The system of claim 2, wherein the plurality of interface interaction layers include at least two of:
   parameters, programmatic systems that include as arguments the parameters, programmatic interfaces that are comprised of the one or more programmatic systems, programmatic classes that are comprised of the one or more programmatic interfaces, programmatic applications that are comprised of the one or more programmatic classes, and programing services that are comprised of the one or more programmatic applications; and wherein the cascaded hashing incorporates the hashing relationships indicative of the relationships between related elements of the plurality of interface interaction layers.

4. The system of claim 1, wherein the ACL includes one or more registered cryptographic identifiers.

5. The system of claim 1, wherein the set of cryptographic identifiers are generated using cascaded hashing across a plurality of interface interaction layers such that the cascaded hashing provides a hierarchy of hashing interrelationships that can be utilized for validation that a lower cryptographic identifier belongs within a higher cryptographic identifier relative to positioning within the plurality of interface interaction layers;

and
wherein the authenticating of the new message by comparing the at least one cryptographic identifier of the new message using the access control list (ACL) against the identifier of the originator device of the new message to determine whether the originator device is permitted to use the computational element associated with the at least one cryptographic identifier includes comparing the at least one cryptographic identifier against another cryptographic identifier within the hierarchy of hashing interrelationships.

6. The system of claim 5, wherein the hierarchy of hashing interrelationships corresponds to a hierarchy of computational object oriented objects in a computer programming language defining which computational object oriented objects inherit or extend from one another, and wherein another cryptographic identifier for comparison is positioned higher within the hierarchy of computational object oriented objects in the computer programming language such that for a successful validation, a computational object oriented object corresponding to the at least one cryptographic identifier would be validated to extend from a computational object oriented object corresponding to the another cryptographic identifier.

7. The system of claim 1, wherein the access control list (ACL) is used to control which of the plurality of user accounts are able to use a particular bridging interface or protocol transformation.

8. The system of claim 7, wherein when the particular bridging interface or the protocol transformation is utilized, usage records are generated to track the usage of the particular bridging interface or the protocol transformation.

9. The system of claim 1, wherein the system is a computer server adapted for providing a message bus hub configured to support synchronous or asynchronous messaging communicated between a plurality of disparate computing devices across a network such that each of computing device of the plurality of disparate computing devices is capable of being designated a source device or a target device for inter-device communications across the message bus hub.

10. The system of claim 9, wherein the computer server is one of a plurality of computer servers each hosting a separate instance of the system that interoperate to provide the message bus hub.

11. A computer implemented method for coordinating data messaging, the method comprising:
generating a set of cryptographic identifiers representing one or more interaction characteristics of a computational element associated with a hardware device or a software handler;
receiving, from a source device, a new message for routing to a target device or a logical target associated with the target device for processing, the new message including at least one cryptographic identifier of the set of cryptographic identifiers;
processing the new message based on the computational element corresponding to the at least one cryptographic identifier of the new message; and
routing the processed new message to the target device;
wherein the processing of the new message comprises:
(i) authenticating the new message by comparing the at least one cryptographic identifier of the new message using an access control list (ACL) against an identifier of an originator device of the new message to determine whether the originator device is permitted to use the computational element associated with the at least one cryptographic identifier; and
(ii) transforming the new message to indicate authorization of the utilization of the computational element associated with the at least one cryptographic identifier;
wherein the access control list (ACL) is stored on non-transitory computer readable media and includes a data structure storing a plurality of user accounts mapped to a plurality of role identifier labels, each role identifier label of the plurality of role identifier labels coupled with a permissions list defining a set of available computational elements that the role identifier label is permitted to interact with;
wherein the plurality of role identifier labels include at least two of a user label, an administrator label, and a superuser label, and each identifier label of the plurality of role identifier labels includes different associated cryptographic identifiers indicative of different available computational elements that the role identifier label is permitted to interact with.

12. The method of claim 11, wherein the set of cryptographic identifiers are generated using cascaded hashing across a plurality of interface interaction layers such that the cascaded hashing provides a hierarchy of hashing interrelationships that can be utilized for validation that a lower cryptographic identifier belongs within a higher cryptographic identifier relative to positioning within the plurality of interface interaction layers.

13. The method of claim 12, wherein the plurality of interface interaction layers include at least two of:
parameters, programmatic methods that include as arguments the parameters, programmatic interfaces that are comprised of the one or more programmatic methods, programmatic classes that are comprised of the one or more programmatic interfaces, programmatic applications that are comprised of the one or more programmatic classes, and programing services that are comprised of the one or more programmatic applications; and wherein the cascaded hashing incorporates the hashing relationships indicative of the relationships between related elements of the plurality of interface interaction layers.

14. The method of claim 11, wherein the ACL includes one or more registered cryptographic identifiers.

15. The method of claim 11, wherein the set of cryptographic identifiers are generated using cascaded hashing across a plurality of interface interaction layers such that the cascaded hashing provides a hierarchy of hashing interrelationships that can be utilized for validation that a lower cryptographic identifier belongs within a higher cryptographic identifier relative to positioning within the plurality of interface interaction layers;
and
wherein the authenticating of the new message by comparing the at least one cryptographic identifier of the new message using the access control list (ACL) against the identifier of the originator device of the new message to determine whether the originator device is permitted to use the computational element associated with the at least one cryptographic identifier includes comparing the at least one cryptographic identifier against another cryptographic identifier within the hierarchy of hashing interrelationships.

16. The method of claim 15, wherein the hierarchy of hashing interrelationships corresponds to a hierarchy of computational object oriented objects in a computer programming language defining which computational object oriented objects inherit or extend from one another, and wherein another cryptographic identifier for comparison is positioned higher within the hierarchy of computational object oriented objects in the computer programming language such that for a successful validation, a computational object oriented object corresponding to the at least one cryptographic identifier would be validated to extend from a computational object oriented object corresponding to the another cryptographic identifier.

17. The method of claim 11, wherein the access control list (ACL) is used to control which of the plurality of user accounts are able to use a particular bridging interface or protocol transformation.

18. The method of claim 17, wherein when the particular bridging interface or the protocol transformation is utilized, usage records are generated to track the usage of the particular bridging interface or the protocol transformation.

19. The method of claim 11, wherein the method is conducted on a computer server adapted for providing a message bus hub configured to support synchronous or asynchronous messaging communicated between a plurality of disparate computing devices across a network such that each of computing device of the plurality of disparate computing devices is capable of being designated a source device or a target device for inter-device communications across the message bus hub.

20. A non-transitory computer readable medium storing machine interpretable instructions, which when executed by a processor, cause the processor to perform a method for coordinating data messaging, the method comprising:
   generating a set of cryptographic identifiers representing one or more interaction characteristics of a computational element associated with a hardware device or a software handler;
   receiving, from a source device, a new message for routing to a target device or a logical target associated with the target device for processing, the new message including at least one cryptographic identifier of the set of cryptographic identifiers;
   processing the new message based on the computational element corresponding to the at least one cryptographic identifier of the new message; and
   routing the processed new message to the target device;
   wherein the processing of the new message comprises:
   (i) authenticating the new message by comparing the at least one cryptographic identifier of the new message using an access control list (ACL) against an identifier of an originator device of the new message to determine whether the originator device is permitted to use the computational element associated with the at least one cryptographic identifier; and
   (ii) transforming the new message to indicate authorization of the utilization of the computational element associated with the at least one cryptographic identifier;
   wherein the access control list (ACL) is stored on non-transitory computer readable media and includes a data structure storing a plurality of user accounts mapped to a plurality of role identifier labels, each role identifier label of the plurality of role identifier labels coupled with a permissions list defining a set of available computational elements that the role identifier label is permitted to interact with;
   wherein the plurality of role identifier labels include at least two of a user label, an administrator label, and a superuser label, and each identifier label of the plurality of role identifier labels includes different associated cryptographic identifiers indicative of different available computational elements that the role identifier label is permitted to interact with.

* * * * *